(12) United States Patent
Alamouti et al.

(10) Patent No.: US 12,407,574 B2
(45) Date of Patent: Sep. 2, 2025

(54) METHOD AND SYSTEM FOR DISTRIBUTED EDGE CLOUD COMPUTING

(71) Applicant: MIMIK TECHNOLOGY CANADA INC., Vancouver (CA)

(72) Inventors: Siavash M. Alamouti, Vancouver (CA); Fay Arjomandi, West Vancouver (CA); Michel Burger, Lafayette, CO (US)

(73) Assignee: MIMIK TECHNOLOGY CANADA INC., Vancouver (CA)

( * ) Notice: Subject to any disclaimer, the term of this patent is extended or adjusted under 35 U.S.C. 154(b) by 51 days.

(21) Appl. No.: 17/080,466

(22) Filed: Oct. 26, 2020

(65) Prior Publication Data

US 2021/0042160 A1   Feb. 11, 2021

Related U.S. Application Data

(63) Continuation-in-part of application No. 16/841,380, filed on Apr. 6, 2020, now Pat. No. 12,095,624.

(Continued)

(51) Int. Cl.
*H04L 67/565* (2022.01)
*G06F 9/50* (2006.01)
(Continued)

(52) U.S. Cl.
CPC ............ *H04L 41/12* (2013.01); *G06F 9/5011* (2013.01); *G06F 9/5072* (2013.01); *G06F 9/547* (2013.01);
(Continued)

(58) Field of Classification Search
CPC ...... G06F 9/5011; G06F 9/5072; G06F 9/547; G06F 2209/505; G06N 5/022;
(Continued)

(56) References Cited

U.S. PATENT DOCUMENTS

| 10,581,891 | B1 * | 3/2020 | Kapoor | ................. H04L 67/535 |
| 2007/0064702 | A1 * | 3/2007 | Bates | ..................... H04L 45/02 |
| | | | | 370/392 |

(Continued)

FOREIGN PATENT DOCUMENTS

| CN | 102970354 A | | 3/2013 |
| CN | 108322487 A | * | 7/2018 |

(Continued)

OTHER PUBLICATIONS

Thomson et al. "IPv6 Stateless Address Autoconfiguration", 2007 (Year: 2007).*

(Continued)

*Primary Examiner* — Eyob Hagos
(74) *Attorney, Agent, or Firm* — Maschoff Brennan

(57) ABSTRACT

Embodiments of an edge cloud computing device are disclosed. In an embodiment, the edge cloud computing device includes an edge node activation module configured to receive a request from an application running in the edge cloud computing device and determine a type of one or more microservices required to service the received request. The edge node activation module is configured to process the request locally in the edge cloud computing device when the determined type corresponds to one or more microservices locally hosted in the edge cloud computing device.

25 Claims, 12 Drawing Sheets

Related U.S. Application Data

(60) Provisional application No. 62/926,455, filed on Oct. 26, 2019, provisional application No. 62/830,249, filed on Apr. 5, 2019.

(51) Int. Cl.
   *G06F 9/54* (2006.01)
   *G06N 5/022* (2023.01)
   *H04L 41/12* (2022.01)
   *H04L 67/02* (2022.01)
   *H04L 67/1097* (2022.01)

(52) U.S. Cl.
   CPC ............ *G06N 5/022* (2013.01); *H04L 67/02* (2013.01); *H04L 67/1097* (2013.01); *G06F 2209/505* (2013.01)

(58) Field of Classification Search
   CPC ... H04L 67/02; H04L 67/1097; H04L 67/565; H04L 41/12
   See application file for complete search history.

(56) References Cited

U.S. PATENT DOCUMENTS

| | | | |
|---|---|---|---|
| 2010/0214953 A1* | 8/2010 | Barnum | H04W 8/005 370/254 |
| 2013/0024901 A1 | 1/2013 | Sharif-Ahmadi et al. | |
| 2014/0297733 A1 | 10/2014 | Wang et al. | |
| 2016/0269482 A1* | 9/2016 | Jamjoom | H04L 67/1095 |
| 2017/0331812 A1 | 11/2017 | Lander et al. | |
| 2018/0082296 A1 | 3/2018 | Brashers | |
| 2018/0113790 A1 | 4/2018 | Chunduri et al. | |
| 2018/0307514 A1 | 10/2018 | Koutyrine et al. | |
| 2018/0359201 A1 | 12/2018 | Rangasamy et al. | |
| 2019/0079744 A1 | 3/2019 | Bosch et al. | |
| 2019/0220703 A1 | 7/2019 | Prakash et al. | |
| 2019/0238636 A1 | 8/2019 | Li et al. | |
| 2020/0036784 A1* | 1/2020 | Lynar | H04L 67/1046 |
| 2020/0106853 A1* | 4/2020 | Steffen | H04L 67/62 |
| 2020/0175033 A1* | 6/2020 | Raghavan | G06F 16/1834 |
| 2020/0177549 A1* | 6/2020 | Barton | H04L 41/40 |
| 2021/0126986 A1* | 4/2021 | Rolf | H04L 67/52 |

FOREIGN PATENT DOCUMENTS

| | | |
|---|---|---|
| CN | 109032567 A | 12/2018 |
| CN | 109542457 A | 3/2019 |
| CN | 110851145 A | 2/2020 |
| WO | 2014/145877 A2 | 9/2014 |
| WO | 2018/144060 A1 | 8/2018 |

OTHER PUBLICATIONS

Dayi Zhou et al. "Scalable Supernode Selection in Peer-to-Peer Overlay Networks", pp. 1-8 (Year: 2005).*
Alam et al. "Orchestration of Microservices for IoT Using Docker and Edge Computing" 2018 (Year: 2018).*
PCT International Search Report and Written Opinion issued in corresponding application No. PCT/IB2020/053285, dated Jul. 16, 2020.
International Search Report issued in corresponding application No. PCT/IB2020/060038, dated Feb. 1, 2021.
Written Opinion issued in corresponding application No. PCT/IB2020/060038, dated Feb. 1, 2021.
Fernandez, et al., Enabling the orchestration of IoT slices through edge and cloud microservice platforms. Sensors 19, No. 13, Jul. 5, 2019.
Varghese, et al., Next generation cloud computing: New trends and research directions. Future Generation Computer Systems 79, Sep. 7, 2017: 849-861.
Yousefpour et al., All one needs to know about fog computing and related edge computing paradigms, Journal of Systems Architecture 98 (2019) 289-330.

* cited by examiner

METHOD AND SYSTEM FOR DISTRIBUTED EDGE CLOUD COMPUTING

CROSS-REFERENCE TO RELATED APPLICATION

This application claims the benefit of U.S. Provisional Application No. 62/926,455, filed Oct. 26, 2019. This application is also a continuation-in-part of U.S. application Ser. No. 16/841,380, filed Apr. 6, 2020, which claims the benefit of U.S. Provisional Application Nos. 62/926,455, filed Oct. 26, 2019 and 62/830,249, filed Apr. 5, 2019. The foregoing applications are incorporated herein by reference.

FIELD OF THE INVENTION

The disclosure relates to cloud computing in general. In particular, the disclosure relates to methods and systems for distributed edge cloud computing.

BACKGROUND OF THE INVENTION

In general, some of the most popular consumer and enterprise applications and solutions are hosted in data centers commonly referred to as the "cloud". Cloud computing has been essential for enabling applications like Facebook®, YouTube®, Instagram®, DropBox®, etc. The underlying architecture corresponds to a client-server architecture where certain nodes or computing devices act as "servers" and other nodes, or computing devices act as "clients". The vast majority of computing devices or nodes today operate in a client-server mode where most of the servers are located in data centers made up of server farms scattered around the world. Such a fixed and hierarchical client-server architecture may be efficient for hosting of applications that provide access to content and information from remote servers to a large number of client devices. Typically, solutions' backends are hosted on the servers that handle compute intensive tasks and the solutions' client application software (frontends) are hosted on the "edge device" that are used for simpler functions, such as, entering commands, caching content, and rendering information for the end user.

One of the advantages of this architecture is rapid and low-cost deployment of (computing and/or storage intensive) applications on generic servers shared amongst many applications with the aid of virtualization and orchestration technologies. However, within the last decade, various trends have been witnessed that make a hierarchical client-server architecture less efficient. The central cloud resources and network connectivity in the current hierarchical architecture are potential bottlenecks for future growth. Sending data from hundreds of billions of client devices to tens of millions of centralized cloud servers leads to wastage of bandwidth and energy and has serious social and economic implications.

Yet another disadvantage of central cloud architecture is the developers' reliance on cloud service providers who have access to the applications and the data stored or processed in their servers. Consequently, today, a handful of very large corporations have control over the vast majority of consumer and enterprise data. In addition, despite all the sophisticated security measures, storing data and hosting applications on third party resources exposes the owners of the information to multiple risks. Cloud resources have been designed for easy access to millions of developers and application service providers which in turn has increased vulnerabilities and security holes. In certain cases, this has resulted in gross abuse of consumer and enterprise data privacy and security.

SUMMARY OF THE INVENTION

Systems and methods are disclosed that implement an effective and feasible approach to address at least the above highlighted challenges and disadvantages. In an embodiment, the system implements decentralization of the cloud by turning any computing device or edge node into a cloud server. By turning edge computing devices into cloud servers, it is possible to reduce the role of digital middlemen and third-party trust elements because central hosting services are not necessary for many applications. In this way, a physical "edge cloud fabric" is created that is potentially orders of magnitude larger than the current "central cloud" fabric.

Embodiments of an edge cloud computing device are disclosed. In an embodiment, the edge cloud computing device includes an edge node activation module that is configured to receive a request from an application running in the edge cloud computing device and determine a type of one or more microservices required to service the received request. The edge node activation module is further configured to process the request locally in the edge cloud computing device when the determined type corresponds to one or more microservices locally hosted in the edge cloud computing device. In an embodiment, the edge node activation module is further configured to provide a microservice runtime environment to execute the locally hosted one or more microservices. In an embodiment, the edge node activation module is further configured to provide a locally hosted API gateway to send the request to the locally hosted one or more microservices. The one or more microservices are configured to service the request and send back a response to the application.

In an embodiment, the edge node activation module is further configured to send, an http/https request corresponding to the received request from the application, to an API gateway hosted in a central cloud computing device when the determined type of one or more microservices, required to service the received request, corresponds to one or more microservices globally hosted in the central cloud computing device. The edge node activation module is further configured to receive, an http/https response for the http/https request, from the API gateway hosted in the central cloud computing device, and wherein the http/https request is serviced by the one or more microservices globally hosted in the central cloud computing device.

In an embodiment, the edge node activation module is further configured to provide a locally hosted API gateway to send the http/https request to the API gateway hosted in the central cloud computing device. In an embodiment, the edge node activation module is further configured to send the request directly to one or more microservices hosted in another edge cloud computing device when the determined type of one or more microservices, required to service the received request, corresponds to one or more microservices hosted in the another edge cloud computing device. In an embodiment, the edge node activation module is further configured to implement a sidecar pattern to form a service mesh corresponding to the one or more microservices locally hosted in the edge cloud computing device and the one or more microservices hosted in the another edge cloud computing device.

In an embodiment, the edge node activation module is further configured to discover one or more other edge cloud computing devices based on a first set of parameters to establish a connection therebetween and provide a microservice runtime environment to execute the locally hosted one or more microservices associated with the connection established between one or more edge cloud computing devices. The first set of parameters includes a user account associated with each of the one or more edge cloud computing devices, a network associated with the one or more edge cloud computing devices, and a proximity of the one or more edge cloud computing devices. In an embodiment, the edge node activation module is further configured to discover one or more microservices supported by the one or more edge cloud computing devices.

In an embodiment, the edge node activation module is further configured to dynamically form one or more clusters with the one or more edge cloud computing devices and communicate with the one or more edge cloud computing devices at a microservice level either directly or through other edge cloud computing devices across the one or more clusters. In an embodiment, the edge node activation module is further configured to expose the locally hosted one or more microservices services to one or more edge cloud computing devices through a common embedded web server. In an embodiment, the edge node activation module includes a webserver embedded there within, wherein the webserver is configured to provide container management APIs using specific language based on an operating system associated with the edge cloud computing device.

Computing devices and computer readable media having instructions implementing the various technologies described herein are also disclosed. Example computer readable media may comprise tangible, non-transitory computer readable storage media having computer executable instructions executable by a processor, the instructions that, when executed by the processor, cause the processor to carry out any combination of the various methods and approaches provided herein. Example computing devices may include a server or a client device comprising a processor, a memory, a client application and/or a network service configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF THE FIGURES

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one with high skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Figure 1:
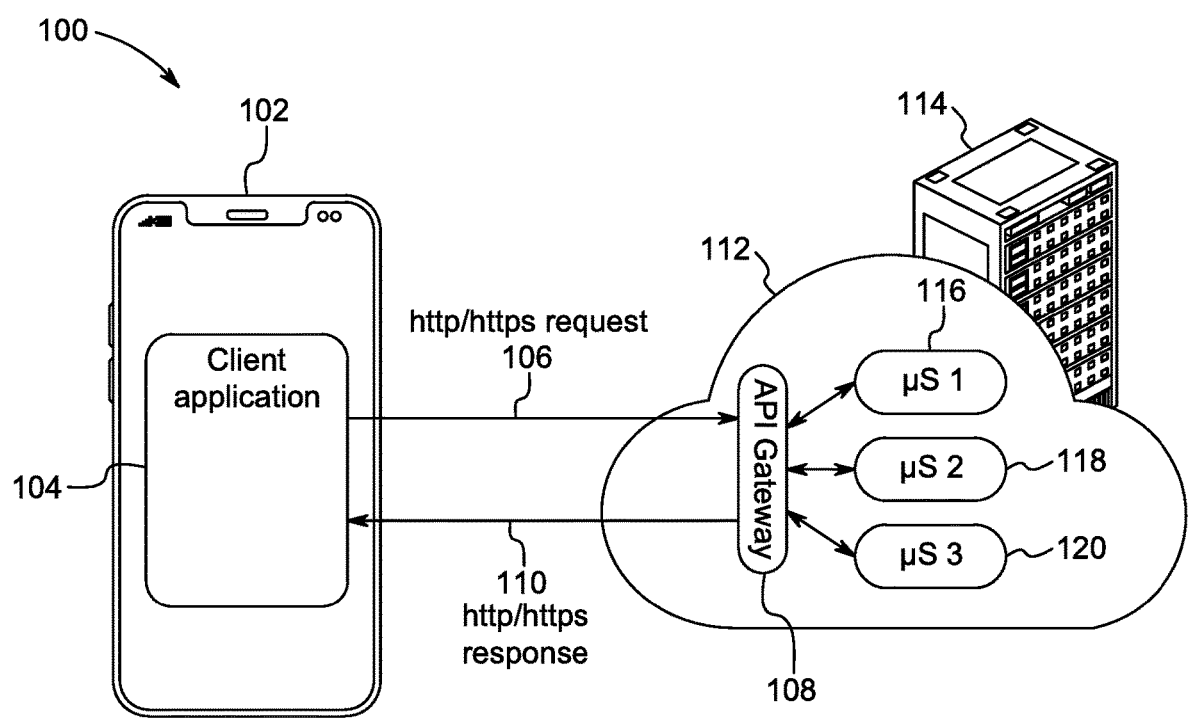
FIG. 1 shows an example cloud architecture 100 using microservices.

The latest evolution of the cloud computing architecture is the move to microservices that decompose a monolithic backend solution into collection of microservices that are dynamically instantiated (serverless) when behind an API gateway. Such an evolution introduces new complexities in microservice to microservice communication and cluster management especially in the context of cloud computing environment. For example, FIG. 1 shows an example cloud architecture 100 using microservices. As shown, a computing device (client device or node) 102 runs a client application 104 that sends an http/https request 106 to an API gateway 108. The API gateway 108 sends an http/https response 110 from the cloud backend 112 hosted in a central cloud computing device 114. Also hosted in the cloud backend 112 is a collection of globally hosted microservices 116, 118, and 120. The http/https response 110 can correspond to one of the microservices (e.g. 120) that was launched in response to the http/https request 106. Such an architecture usually includes a client application (e.g. 104) on a computing device (e.g. 102) and a collection of central cloud functions to support hosting the solutions' backend that is usually composed of a series of microservices (e.g. 116, 118, 120) reachable through an API gateway (e.g. 108). In such a scenario, every http request is sent from the "client device" to the servers (e.g. 114) in the central cloud as in case of a typical server-client architecture.

Figure 2:
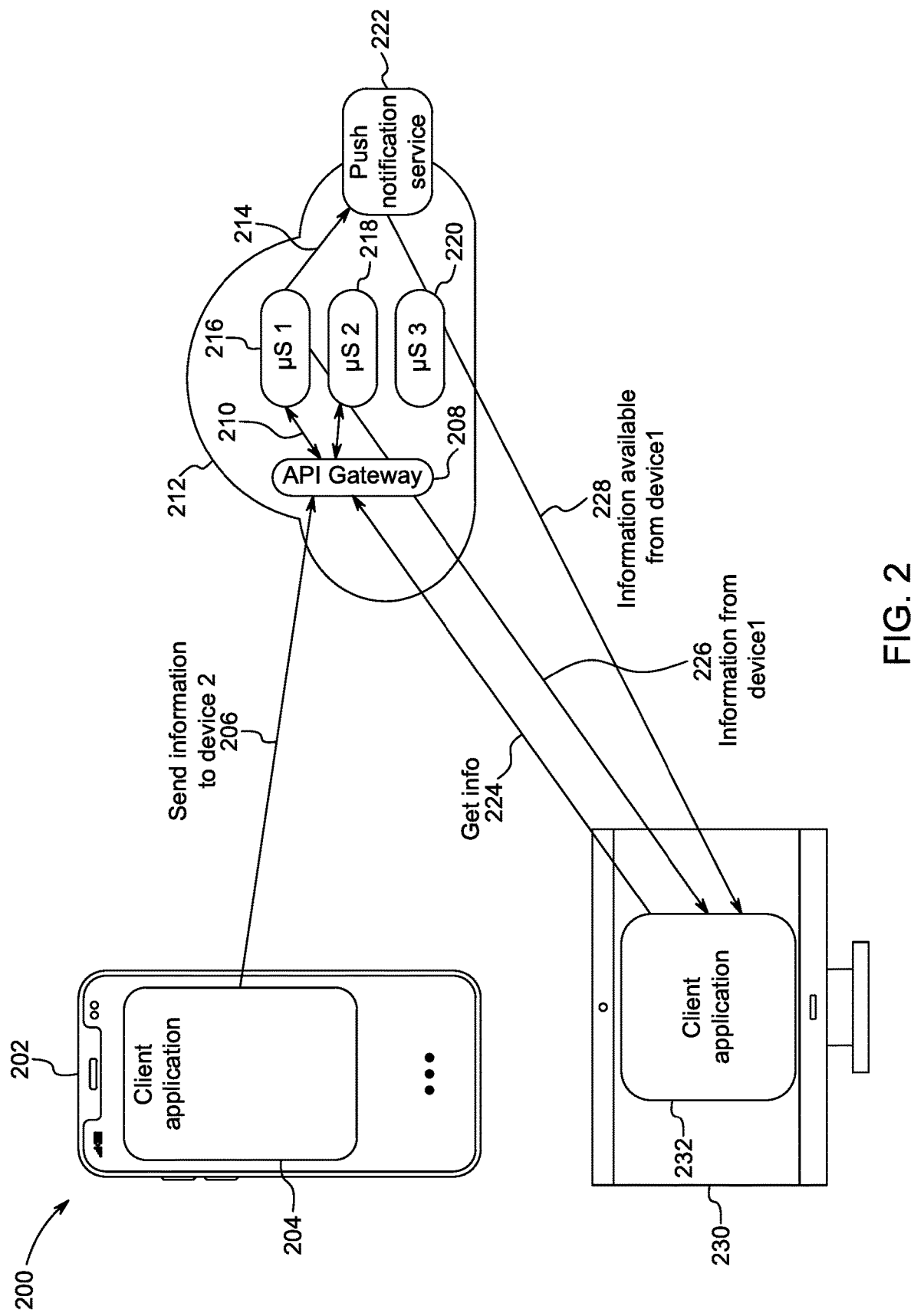
FIG. 2 shows another example of cloud architecture 200 using microservices.

Yet another example of cloud architecture 200 for a client to client communication is shown in FIG. 2. Consider the scenario where 1' client device 202 running a client application 204 wishes to send information to $2^{nd}$ client device 230 running a client application 232. The client application 204 sends an http request 206 that ends up at an API gateway 208 hosted in the central cloud 212. The https request 206 corresponds to an appropriate microservice (e.g. 216, 218, 220) hosted on the central cloud 212 that gets launched in response by a request 210. The launched microservice (e.g.

216) sends a trigger 214 to a push notification service 222 to communicate information available from the $1^{st}$ client device (228) to $2^{nd}$ client device 230. Next, the client application 232 running in $2^{nd}$ client device 230 responds with a (get info) request 224 to the API gateway 208 that is serviced again by a microservice (e.g. 216) hosted on the central cloud. Next, the servicing microservice (e.g. 216) sends the information from $1^{st}$ client device (226) to $2^{nd}$ client device 230. Therefore, even if the two client devices ($1^{st}$ and $2^{nd}$ client devices) are in close proximity and on the same local network, all communications and data would need to go through servers in a data center that may be 100s of miles away which may be suboptimal and undesirable.

An effective and feasible approach to address this issue is to enable any given computing device to act as a cloud server. Enabling computing devices to act as cloud servers, may potentially reduce the reliance on third party cloud services that are not necessary for the applications. Further, this approach may also allow microservice-based solutions to be more flexible by dynamically moving microservice from the backend to the computing device (now acting as a server). Many of the functions performed in the central cloud may be performed on edge devices "acting" or "configured" as servers. Once the computing devices are configured to act as servers, a decentralized edge cloud computing (architecture) may be provided that is orders of magnitude larger than the existing central cloud. There are numerous benefits of such an architecture that include: reduced cloud hosting costs, reduced communication bandwidth and network efficiency, reduced energy consumption and carbon emission, reduced latency, reduced application development time, advantages of embracing the microservice trend, increased data privacy and provision for consumers and enterprises to exercise better control over their data.

In an embodiment, the first step to accomplish this is to remove the constraint that servers can only exist in data centers. This is a fundamental constraint that defines the dominant fixed and hierarchical client-server infrastructure for internet today. An alternative architecture is disclosed herein that follows a pragmatic approach by enabling any computing device to act as either a client and/or a server based on the real-time needs of an application.

As mentioned earlier, various trends have been witnessed that make the existing hierarchical client-server architecture less efficient. For example, the first trend is the explosion of computing devices and embedded computing in all things, and the increasing capabilities of the edge devices. For instance, there is more computing power, memory, and storage available in today's smart phones than in powerful servers just a decade ago. For example, the second trend is the enormous amounts of data generated on these (edge) devices. With the advent of social media on mobile devices, orders of magnitude more personal multimedia content is generated on devices (photos, videos, sensor data, etc.) than premium content from major studios and broadcasters hosted on central servers in the cloud. Today, most of the data generated on (edge) devices is sent back to the central cloud for processing and to facilitate sharing. The third trend is the decomposition of solutions in collection of microservices and the automation of deployment that make backend solutions much more dynamic (serverless) with a scalability that closely fits the demand either in volume or even geography.

As an example, there are currently over 80 million Sony PlayStation 4 (PS4™) consoles in peoples' homes. This represents over 600 million processor cores and about 40,000 petabytes of storage. In comparison, this represents much larger computing, storage, and memory resources in the aggregate than the entire Amazon Web Services (AWS®) infrastructure. There are billions of PCs, set-top-boxes, game consoles, streaming players, routers, smart phones, tablets, and other computing devices that can potentially act as cloud servers and collectively have orders of magnitude more computing power than the existing "central cloud". The present disclosure provides for systems and methods to create a cloud fabric made up of billions of edge cloud computing devices (or nodes or edge nodes) that is orders of magnitude larger than the existing central cloud.

The disclosed embodiments of decentralized cloud architecture do not require the creation of new network nodes with dedicated hardware. Instead, the disclosed architecture enables existing computing devices such as PCs, tablets, set-top-boxes (STBs), or even home routers to act as cloud server nodes at the edge of the cloud network when plausible. The disclosed approach does not require any change to the low-level design of these devices. All that is required is a downloadable application (e.g. edge node activation module) that runs on top of existing operating systems without any changes to the hardware or the OS Kernel of existing devices. Apart from providing a powerful arsenal for developers to decentralize the existing cloud infrastructure, the disclosed architecture provides consumers with more control over their personal data. Furthermore, amongst other things, the disclosed approach minimizes the cost of hosting and delivery of application and services, improves network performance and minimizes latency.

Embodiments of edge cloud computing platform are disclosed. The disclosed cloud platform accelerates the decentralization as the next revolution in cloud computing. The primary step in cloud decentralization is to remove the constraint that servers can only exist in data centers. This is a fundamental constraint that defines the dominant client-server infrastructure for internet today. The present disclosure provides for an alternative architecture/platform and a pragmatic approach to achieve this by enabling any computing device to act as either a client or a server based on the real-time needs of an application. Also disclosed is a cloud platform to create the edge cloud fabric using edge node activation modules and one or more backend services.

The benefits and advantages of disclosed architecture and platform include reduced cloud hosting costs, reduced communication bandwidth, increased network efficiency, reduced energy consumption and carbon emission, reduced latency, increased privacy and better control over consumer and enterprise data.

Embodiments of a method of providing edge cloud computing infrastructure in a communication network are disclosed. The communication network includes one or more edge cloud computing devices in communication with at least one server computing device. In an embodiment, the method includes determining, by a first edge cloud computing device, a type of one or more microservices corresponding to a request from an application running in the first edge cloud computing device. The method further includes processing, by the first edge cloud computing device, the request locally in the first edge cloud computing device when the determined type corresponds to one or more microservices locally hosted in the first edge cloud computing device. The method further includes providing, by the first edge cloud computing device, a microservice runtime environment to execute the locally hosted one or more microservices.

In an embodiment, the method further includes providing, by the first edge cloud computing device, a locally hosted API gateway to send the request to the locally hosted one or more microservices. In an embodiment, the method further includes sending, by the first edge cloud computing device, an http/https request corresponding to the request from the application, to an API gateway hosted in a central cloud computing device when the determined type of one or more microservices corresponds to one or more microservices globally hosted in the central cloud computing device. The method further includes receiving, by the first edge cloud computing device, an http/https response to the http/https request, from the API gateway hosted in the central cloud computing device, and wherein the http/https request is serviced by the one or more microservices globally hosted in the central cloud computing device. In an embodiment, the method further includes providing, by the first edge cloud computing device, a locally hosted API gateway to send the http/https request to the API gateway hosted in the central cloud computing device.

In an embodiment, the method further includes sending, by the first edge cloud computing device, a data request from the locally hosted one or more microservices directly to one or more microservices hosted in a second edge cloud computing device when the determined type of the request from the application corresponds to a data request for the second edge cloud computing device. In yet another embodiment, the method further includes providing, by the first edge cloud computing device, a sidecar pattern to form a service mesh to support the application running in the first edge cloud computing device. The method further includes exposing, by the first edge cloud computing device, the locally hosted one or more microservices services through a common embedded web server to one or more edge cloud computing devices. In an embodiment, the method further includes providing, by the first edge cloud computing device, container management APIs using specific language based on an operating system associated with the edge cloud computing device.

In an embodiment, the method further includes discovering, by the first edge cloud computing device, one or more other edge cloud computing devices to establish a connection therebetween and providing, by the first edge cloud computing device, a microservice runtime environment to execute the locally hosted one or more microservices associated with the connection established between one or more edge cloud computing devices. In an embodiment, the method further includes discovering, by the first edge cloud computing device, one or more microservices hosted in the discovered one or more other edge cloud computing devices and establishing, by the first edge cloud computing device, a direct microservice level connection between the locally hosted one or more microservices and the discovered one or more microservices in the one or more edge cloud computing devices. In an embodiment, the method further includes loading and executing, by the first edge cloud computing device, one or more microservices required to service the request from the application. The method also includes stopping, by the first edge cloud computing device, the loaded one or more microservices once the request from the application has been serviced.

Figure 3:
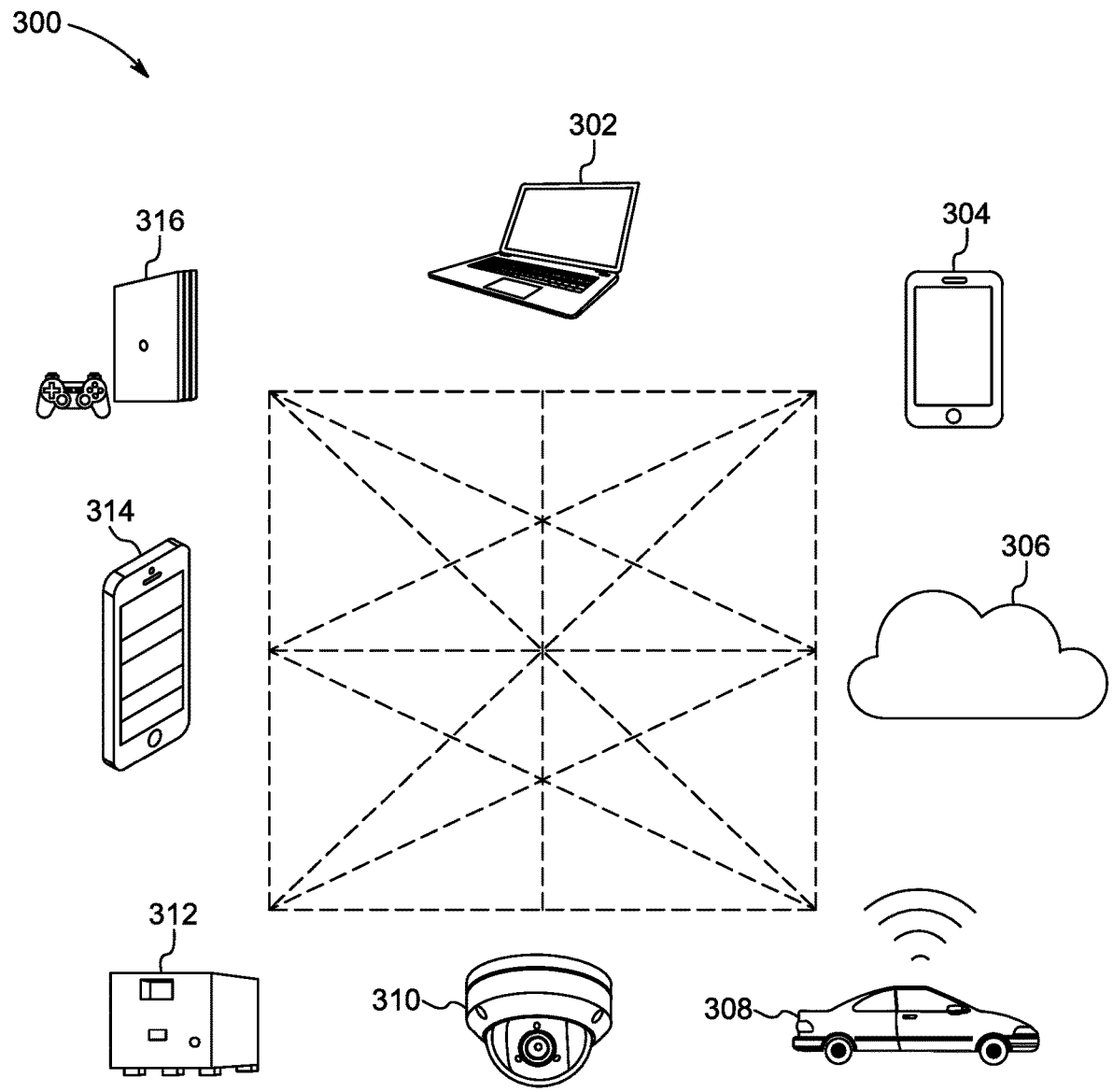
FIG. 3 shows an exemplary embodiment 300 of an edge cloud computing network.

FIG. 3 depicts an embodiment of an edge cloud computing network 300. In the existing "central cloud" model, as more devices are added or more content is generated by devices, more servers in data centers must be added to support them. With a distributed edge cloud computing network 300 as shown in FIG. 3, a cloud fabric can be created that scales with the number of edge devices. This reduces the need for additional servers in data centers as the number of edge devices and content generated by edge devices grow.

In the ongoing description, the "edge devices" are interchangeably referred to as "nodes" or "edge nodes" or "edge computing devices" or "edge cloud computing devices". Accordingly, the "cloud" capacity is increased as the number of edge cloud computing devices grow. In addition, given that most of the data is produced at the edge, transport costs and latencies for applications are minimized. In the disclosed approach, most of the processing is performed at the edge, communication is kept as local as possible, and edge cloud computing devices collaborate and share computing and other resources. For the purposes of the ongoing description, the "central cloud" or "central cloud computing device", refer to one or more servers in data centers, that remain as valuable resources as they may be indispensable for many applications that require central storage or processing. However, in the proposed edge cloud platform and architecture, the central cloud will no longer be a bottleneck or the "necessary" trust element and do not need to grow in proportion with edge nodes. It may be noted that data center resources may need to increase but at a reasonable pace to accommodate the needs for central processing only. All the other possible tasks and functions can be relegated to the edge nodes where today most of the data is generated.

As shown in FIG. 3, the edge cloud computing network 300 includes a plurality of edge cloud computing devices, such as, a laptop 302, a tablet PC 304, a central "cloud" 306, a car infotainment system 308, a security camera 310, a server computing device 312, a mobile device 314, and a gaming console 316. In an exemplary embodiment, each of the edge cloud computing devices can be configured to act as a client or a server as per the need of the edge cloud computing network 300. Furthermore, the FIG. 3 shows connection or communication paths between the edge cloud computing devices as dashed lines. As would be appreciated by those skilled in the art, the architecture does not follow the conventional client-server mode where one or more devices are designated to always act as "servers" and the other devices always act as "clients".

In the proposed architecture of the edge cloud computing network 300, there is a fragmentation in operating systems and networks which may be a challenge to make the proposed architecture feasible. For example, each of the edge cloud computing devices may use different operating systems, such as, multiple variants of Linux®, android, iOS®, macOS®, Windows®, Fedora™, etc. Furthermore, the edge cloud computing devices may be configured to operate using different networking technologies, such as, fixed (Ethernet, fiber, xDSL, DOCSIS®, USB, etc.), mobile WAN (2G, 3G, 4G, etc.), Wireless LAN (WiFi®, etc.), Wireless PAN (Bluetooth®, WiGig, ZWave®, ZigBee®, IrDA, etc.), and machine networks (SigFox®, LoRa®, RPMA, etc.). To address this challenge, the proposed cloud architecture includes edge cloud computing devices (e.g. 314) that when "activated" are configured to connect, communicate, and collaborate with other edge cloud computing devices across many fragmented operating systems and network technologies.

In another aspect of the disclosure, the availability of network resources may be a challenge in the edge cloud computing network 300. Accordingly, once edge cloud computing devices (e.g. 312, 314) act as servers, they can connect and communicate with other edge nodes using uplink network resources. Although, network connectivity is gradually becoming symmetrical, typically there are more downlink than uplink resources available. As an illustrative example, posting a video from an edge node to the central cloud to be consumed by three other edge nodes needs different uplink/downlink resources directly as compared to (directly) streaming the video from the source to destination nodes. In the centralized cloud network, there is one instance of uplink and three instances of downlink, and in the proposed decentralized edge cloud computing network 300, there are three instances of uplink (assuming none are behind a firewall). Therefore, availability of network resources would be an important aspect for the distributed edge cloud platform to be feasible. The solution to this is explained in relation to the "meritocracy" principle.

In yet another aspect of the disclosure, unlike servers in data centers, most edge nodes may be nonpersistent in nature. There may be less control over their availability and reliability, especially with battery operated mobile devices. The proposed edge cloud computing architecture overcomes this challenge by a "microservice" approach explained below. In an embodiment, the non-persistent nature of the edge nodes is considered when building certain applications where persistent nodes are essential. Persistent nodes can always be provisioned using other collaborating edge nodes, or in the worst case, central cloud can be used.

Yet another challenge that needs to be overcome is distribution management. In data centers, the distribution management deals with resource availability based on simpler criteria such as CPU load, memory constraint and IO. The scope of distribution management is the specific data center where the solution (backend) is running With edge cloud, the criteria for distribution management are much more diverse and include power availability and consumption, reliability, and device capabilities. As discussed later, with edge cloud computing architecture, distribution scopes expand to network, proximity and account since most devices belong to specific users.

Existing central cloud architecture may be efficient where the information is generated and/or stored in a central place/device and most edge nodes are used to receive that information from the world wide web (through a series of dedicated servers reachable through http). However, due to the rapid growth of social media, user-generated content, internet of things (IoT), and machine generated data, edge nodes are generating most of the data today. Therefore, one of the critical considerations is the architecture(s) that is most suitable for a fundamental transformation in data generation and usage as proposed in the ongoing disclosure.

With the decentralized edge cloud, all nodes including the "central cloud" (e.g. 306 in FIG. 3) can act as cloud servers and there is no designated permanent trust element. Edge nodes or edge cloud computing devices are configured to communicate directly, collaborate, and share resources directly without resorting to a third-party trust (central) element unless necessary. With this approach, central cloud resources are used only when needed, for instance, when there is a need for global storage, archiving, updating of centralized databases, centralized registration, etc. Any other function that can be handled by the edge nodes can be assigned to them, for instance, messaging between devices, or handshaking of control signals between machines, or transmitting data between nodes within a small cluster.

Furthermore, the ongoing trends in the software industry makes the proposed decentralization very feasible. The complexity of managing software solutions made of large number of components in the past led to monolithic solutions. However, the evolution of virtualization technology towards lighter container management platforms like Docker® & CoreOS®, the consumerization of on-demand IT and the ease of rich communication (API), has reduced the complexity significantly. A good software design practice is to develop solutions as a collection of many instances of single purpose, well-defined components referred to hereinafter as "microservices".

The consequences of designing cloud systems in this way are: more granular utilization of infrastructure resources to closely follow the demand curve, simplification of the design of complex attributes (session, tenancy), better distribution and utilization of computing resources within or between data centers, and further decomposition of solutions' client from a monolithic to microservice architecture for faster application development time and easer of software upgrade and maintenance. To achieve higher efficiency of the software solution in the proposed architecture, programming using ephemeral microservices, also referred to as "server-less" or "serverless" architecture, is implemented where microservices are instantiated (launched and run) based on API calls made to the microservice itself.

In an exemplary embodiment, the cloud is extended to the edge by recognizing and exposing computing resources and utilizing them in an opportunistic way when available. Further, adding analytics to the way ephemeral microservices are deployed based on the availability, policy, and context (including social and other application level events), enable optimal deployment of applications on the edge cloud computing network 300.

The disclosed architecture assumes that existing edge cloud computing devices can be easily turned into edge cloud servers (or edge cloud server computing devices). It is envisaged under the scope of the description that developers should be able to build applications (supported by the edge cloud) with as little effort as possible. Given the heterogeneous nature of the edge cloud computing devices, the disclosed approach assigns functional roles based on device capabilities. For ease of application development by developers, similar API semantics as that of the central cloud, for instance, Amazon Web Services® (AWS) or Microsoft Azure® are implemented and followed. Furthermore, a light container to run the microservices on edge nodes and the semantics of existing container technologies, such as, for instance, Docker® or CoreOS®, are implemented.

In the disclosed approach, an edge node or an edge cloud computing device is configured to demonstrate a plurality of capabilities to become a potential edge cloud server or edge cloud server computing device. The plurality of capabilities includes the ability to discover the existence of other edge nodes or edge cloud computing devices regardless of the operating system (OS) or network associated with them. The plurality of capabilities also includes the ability to discover other nodes' capabilities and behavior (e.g. hardware specs, OS, persistency, etc.). The plurality of capabilities further includes the ability to discover one or more microservices supported by other edge nodes or edge cloud computing devices and dynamically form clusters along with other edge nodes or edge cloud computing devices especially around network, proximity, and user account.

In another embodiment, the plurality of capabilities further includes the ability to communicate with other nodes at the microservice level either directly or through other nodes across different clusters and connect with other nodes if they chose to share data, services, and/or resources. In a still further embodiment, the plurality of capabilities further includes the ability to adapt to assigned functions and roles based on resources and capabilities and process and analyze data locally. Furthermore, the plurality of capabilities further includes the ability to be as secure and trustable as the central cloud.

In an embodiment, the configuration of the edge node or the edge cloud computing device to demonstrate the plurality of capabilities is achieved in a platform-agnostic approach. In an embodiment, a downloadable application-level software (e.g. edge node activation module) is provided that turns any edge cloud computing device into an edge cloud server and as a result builds an end-to-end edge cloud platform. It is to be noted by those skilled in the art that the proposed approach requires no changes to the device hardware, OS Kernel, or drivers and works on most modern hardware (PCs, STBs, routers tablets, smart phones, etc.). It is also to be noted that the proposed software-level application has a very small memory footprint and supports microservices that can be easily loaded, run, and stopped across the edge cloud computing devices.

Furthermore, the disclosed approach supports multi-tenancy, multiple applications and microservices with a single instance of software to support multiple customers. The disclosed cloud platform has a light, but highly scalable backend (services) hosted on a "central cloud" (e.g. 306 in FIG. 3) and uses a bootstrap mechanism for registration of the nodes or other edge cloud computing devices. The disclosed cloud platform provides the ability to create dynamic clusters of edge nodes within a same network, proximity and (user) account and to manage mobility characteristics (appearing and disappearing) of nodes inter and intra clusters.

In an embodiment, the edge cloud computing network 300 provides for management of communication between the edge nodes or edge cloud computing devices either directly or through intermediate nodes and dynamic instantiation of backend resources or services based on demands from the edge nodes. In addition, edge cloud computing network 300 creates effective persistence by pulling collaborating edge nodes and/or resources dynamically.

To utilize the power of edge nodes and create a massive decentralized edge cloud, the disclosed approach considers and implements various principles in the edge cloud architecture. The first principle of decentralization implemented by the disclosed approach is "meritocracy". All nodes have an equal opportunity to participate in the edge cloud computing network 300. Nodes may take any role based on their capabilities. Capabilities that are enabled by the node owner are stored in the node profile. For instance, a node with large storage can become a "cache node" or a "backup storage node", a node with great network connectivity can be a "proxy node", and a persistent node can become the holder of knowledge (e.g., device and capability/role profiles) for a cluster of nodes and so on. Meritocracy prevents the need to provision central elements with predefined roles which leads to a hierarchical structure of nodes.

In an embodiment, other principles, such as, "transparency", that are necessary for meritocracy to work are also implemented in the disclosed approach. For instance, the nodes should tell the truth regarding their profiles in a transparent manner or else the principle of meritocracy cannot be applied effectively. The disclosed architecture removes incentives to lie (e.g. not providing any node-specific privileges or rights). Even when there is no apparent incentive to lie (e.g., provide false information, misleading information, or disinformation), the disclosed architecture implements a mechanism to blacklist nodes that lie about their profile to harm the operations of a cluster in the edge cloud computing network 100. In addition, the meritocracy may change with time and nodes may upgrade or downgrade their capabilities and profiles. The disclosed architecture accommodates any such changes to the nodes in real-time.

One of the important considerations with regards to the "meritocracy" principle is the merit of central cloud resources in the proposed architecture. The central cloud architecture can be considered as a special case of edge cloud computing architecture where the edge nodes are used only as clients. Therefore, it may be desirable to discontinue the existing bad practices or falling back on readily available resources on central cloud in order to speed up development while sacrificing hosting costs, latency, and privacy. For the meritocracy principle to work effectively, all nodes are considered as a potential "server" to other nodes and all requests need to be kept local to the cluster where a node is active.

The second principle of decentralization implemented by the disclosed approach is "distributed discovery". A node in the edge cloud computing network 100 needs to discover other nodes. In the ongoing disclosure, discovery is intended to be a "filtered search" operation based on a scope. Illustrative and non-limiting examples of a scope include a user account (nodes registered under the same account ID), network (nodes that are members of the same link-local cluster network), proximity (nodes which are reporting themselves as physically present at a geographical location or within an area defined by a geospatial query). In an embodiment, the discovery process uses any combination of these or other scopes without a dedicated central node, for instance, a central node acting as a presence server. If a node sits behind a firewall and is not reachable from outside, it should rely on any nodes that are reachable to become discoverable. The node should not rely on a central entity unless it is absolutely necessary. In an embodiment, the discovery process includes information about how to connect and communicate to a device, important characteristics, roles, and personas that an edge node can adopt. The roles can include cache node (a node with spare storage), proxy node (good connectivity to internet), CPU resources (node with spare CPU to run microservices), etc.

The third principle of decentralization implemented by the disclosed approach is "clustering". Human and machine communicate in clusters. Robert Dunbar, an anthropologist suggested a cognitive limit of 150 for people with whom humans can have a stable relationship. In other words, humans communicate in constrained clusters. Additionally, humans seldom communicate with everyone in close relationship circle regularly or frequently. In fact, daily communication may be limited to a handful of very close relationships. Therefore, it makes logical sense that the proposed communication framework for edge cloud computing architecture takes this into account when assigning roles and responsibilities to nodes within a cluster.

The above characteristic of communication is however not limited to humans. The communications between machines is very similar and most of the communication is often between a very small set of nodes in a cluster at any given instance of time. Therefore, all communications can be optimized to occur local to the cluster as much as possible. In order to remove the requirement for any node to have to handshake with every other node, in the proposed architecture, one node (supernode) in the cluster is given a special role as the knowledge holder of the cluster. The supernode is assigned the role of communicating this knowledge for/to global discovery or nodes in other clusters. The proposed approach allows nodes to dynamically form their own ad-hoc clusters based on the three given scope described earlier. Nodes dynamically take roles via election or selection by other nodes based on series of characteristics of nodes and rules. By doing so, the nodes dynamically form the fabric of edge cloud (i.e. Software Defined Cloud Infrastructure). As nodes enter and exit clusters, the roles are dynamically reassigned.

Nodes communicate mostly in (constrained) clusters. The disclosed communication framework in the edge cloud, therefore, takes this into account when assigning roles and responsibilities to nodes within a cluster. A cluster is formed by a first active node (or a first edge cloud computing device) based on a given scope. When a node is "activated", it first looks for a "supernode" (also referred to as "super edge cloud computing device" in the ongoing description). The supernode oversees global discovery and holds knowledge of the edge cloud. If no supernode is found, the first node (or the first edge cloud computing device) declares or designates itself as the supernode. If a communication network is available, the supernode then informs global discovery of its existence and receives the list of nodes within the defined scope. To maintain efficiency, the supernode informs other nodes within its scope. Subsequently, a better supernode may be identified, and that better supernode can them inform the global discovery of its existence and then function as the supernode.

Once a cluster has been created by the supernode, subsequent nodes entering the cluster are configured to, discover the existing supernode, register themselves to the supernode, and receive the list of nodes within their scope. The new nodes inform other nodes within their scope of their existence. The disclosed edge cloud implements this bootstrap model to avoid overloading any nodes, whether global or local, and therefore reduces traffic and chattiness and creates a light and scalable architecture. Given the potential mobility of the nodes, presence notification is a function of the node itself along with the responsibility to decide which other nodes it wants to notify. Therefore, the disclosed edge cloud architecture does not implement a single global presence server or a point of registration in the disclosed edge cloud computing network. Similarly, the disclosed architecture does not have a "keep alive" mechanism at the infrastructure level between the nodes. In an embodiment, such mechanism can be delegated to microservices if needed in certain scenarios.

The fourth principle of decentralization implemented by the disclosed approach is "microservice to microservice communications". To create a distributed edge cloud fabric, applications on edge cloud computing devices or nodes may communicate directly without a third-party trust element unless absolutely necessary. This can allow the devices to connect the edge nodes together at the network level. However, it is not sufficient to connect devices or edge nodes at the physical network level. Microservices running on the edge nodes need to communicate directly. In an embodiment, the edge node activation module in edge nodes provide for a light container that enables deploying and hosting microservices on edge nodes to utilize the formed edge "cloud fabric" to communicate directly with other microservices thereby creating a "service mesh". Furthermore, edge nodes are configured to load, start, and stop microservices on any other edge node in the edge cloud computing network 100. This configuration ensures that microservice management across the disclosed cloud platform remains distributed without the need for a central entity.

In an embodiment, the microservices enabled on the edge nodes expose their services through a common embedded webserver. API endpoints for each service are accessible from all other edge nodes in an edge cluster. In an embodiment, the edge cloud enables seamless reachability of microservices across edge nodes to form a service mesh either directly or via a "sidecar pattern" described later in more detail. In environments that can run container daemons (e.g. Linux), the disclosed edge cloud platform provides functionalities to manage ad-hoc clusters of edge nodes. In environments that cannot run container daemons (e.g. smart phones), the disclosed edge cloud platform provides additional "light" container capabilities with the ability to download, deploy and operate microservices.

The fifth principle of decentralization implemented by the disclosed approach is "dynamic resource instantiation". For decentralization to be efficient, it is desirable to have very little overhead associated with the nodes to join a cluster, leave a cluster, or get assigned resources. For the purposes of the ongoing description, the solution implemented by the disclosed edge cloud architecture is referred to as "dynamic resource instantiation". According to this principle, signaling and data resources are deployed dynamically (by back-end service) based on network's condition and a demand from edge nodes within one or more clusters thereby eliminating the need to reserve computing resources. This increases efficiency and reduces cost by dynamically deploying the end points (e.g. SEP, BEP) which are instantiated only when needed. The disclosed cloud platform assists the edge nodes to setup tunneling opportunistically to increase signaling and data bandwidth efficiency. Resources are deployed based on parameters based on network topology and demand by the application running on the edge node. In an embodiment, the parameters include time to go-live, number of concurrent connections, and communication protocols (HTTP, SSH, Web socket or UDP tunneling). If desired, end points can be deployed on available computing resources within the closest proximity of a given cluster.

The sixth principle of decentralization implemented by the disclosed approach is "collaboration". In order to leverage the collective power of edge nodes in the decentralized edge cloud network, it is desirable that the edge nodes collaborate and share resources. The sharing of decentralized cloud resources is desirable to be as seamless as in case of a central cloud. As a first step, the disclosed cloud architecture is able to uses the collective resources of all the edge cloud computing devices. For instance, a video is recorded in HD format on the mobile phone 314 and the recorded content is seamlessly stored on the laptop 302 or even a connected storage dongle. As a next step, the disclosed architecture enables sharing of resources with friends and family. For instance, allowing family members to share a Network Attached Storage (NAS) as a family resource. In an embodiment, the disclosed architecture also provides the ability to lease computing resources to strangers and to create an even larger edge cloud. This way, a cloud fabric is created from numerous edge nodes that is orders of magnitude larger than the central cloud.

It may be noted that the disclosed approach does not intend to tie edge cloud tightly to collaboration. Edge cloud provides an opportunity to take advantage of collaboration and resource sharing across edge nodes. However, even without collaboration, edge cloud can provide much of the benefits described above. As a fundamental step, any application built on any edge device prioritizes using its local resources (instead of central or global resources) to host microservices to service other nodes in its cluster based on the requirements of the application. For instance, Jack's device should be used as a server to host Jack's app. However, with collaboration, the approach can be expanded further to use resources on other nodes. For instance, Jill's phone can run a microservice for Jack's application even when they're not in an active session, or Jack can provide spare storage for Jill's videos on his device, or Jill can use Jack's fiber connection instead of her poor cellular connection at the time. In other words, collaboration can significantly improve efficiencies and scaling, but may not be necessary to make edge cloud useful.

The seventh principle of decentralization implemented by the disclosed approach is "infrastructure independence". As describe earlier, for cloud decentralization, it is desirable that the disclosed cloud platform is agnostic to operating systems, network (type and technology) and location. Due to various reasons, there have been many failed industry attempts to standardize decentralized communication between nodes. Therefore, the proposed decentralized cloud platform is independent of the evolution of the operating systems and networks. In other words, the disclosed cloud platform operates on top of existing operating systems and networking standards at the application layer. This principle ensures that the disclosed cloud platform is deployed and maintained in the long-term with minimal or no dependencies. The disclosed cloud platform also avoids issues with legacy protocols, modules, libraries, data, etc.

Figure 4:
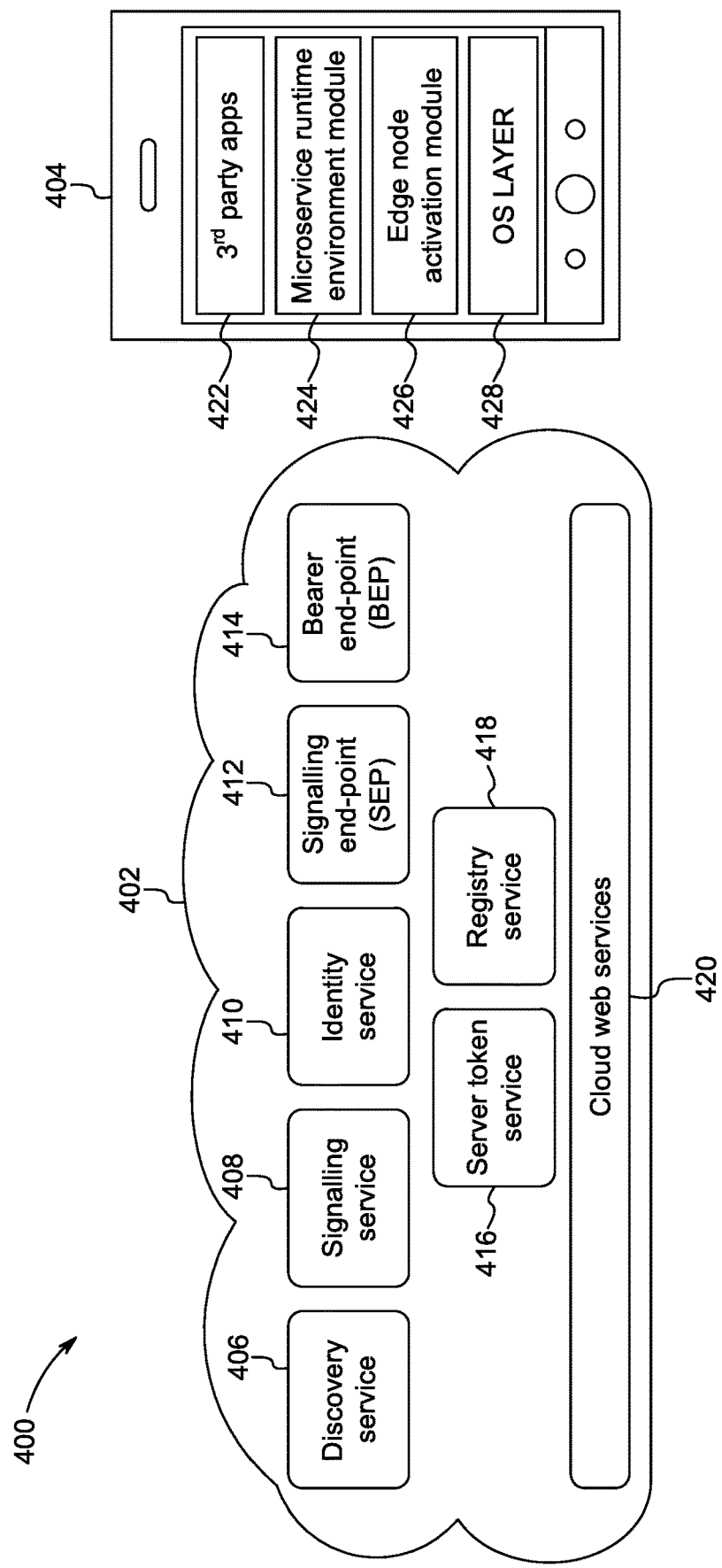
FIG. 4 illustrates fundamental building blocks of edge cloud architecture 400 in accordance with an embodiment.

FIG. 4 illustrates fundamental building blocks of edge cloud computing architecture in accordance with an embodiment of a distributed edge cloud platform 400. Based on the above described principles, the disclosed distributed edge cloud platform 400 is designed and developed. It is envisioned to be a pragmatic way of enabling edge cloud by configuring every edge cloud computing device to function as an edge cloud server. As described earlier, such configuration is performed in a completely distributed fashion agnostic to hardware platforms, operations systems, and underlying networking technologies. The disclosed cloud platforms, microservices, edge nodes (or edge cloud computing devices), and cloud clusters are configured to run on any operating system and to communicate over any network. Furthermore, the disclosed cloud platform and distributed cloud services are independent of any infrastructure.

As shown in FIG. 4, the distributed edge cloud platform 400 is an end-to-end system that includes central and edge elements that are its fundamental building blocks. The central element includes a backend services module 402 provided by a server computing device and the edge element includes the edge node activation module 426, and one or more microservices (e.g., 518, 520, 522 as described later with reference to FIG. 5). It will be appreciated by those skilled in the art that the disclosed architecture is intended to be distributed and that the elements (central or edge) can reside anywhere on any reachable edge cloud computing device (e.g., 302, 304, 306, 312).

Referring to the central elements of the distributed edge cloud platform 400, the backend services module 402 is hosted on servers reachable through the internet and provides necessary services to support the edge nodes or edge cloud computing devices across the edge clouds. For the purposes of the ongoing description, an edge cloud is defined as a collection of nodes (e.g. 302, 304), each with a globally unique ID, based on a context or a scope of capability of the particular device. In an embodiment, a given node may be a member of multiple clusters (e.g. see node 730 in FIG. 7). For example, a first cluster can correspond to a user account cluster, which is the cluster of nodes belonging to the user that registered them. A second cluster can correspond to a network cluster (e.g. 726) which is the link-local network cluster it is physically connected to. A third cluster can correspond to a proximity cluster (e.g. 736) which is the cluster of nodes within a certain surrounding area.

In an embodiment, the backend services module 402 is configured to provide one or more backend services that include a discovery service 406, a signaling service 408, an identity service 410. The signaling service 408 further provides resources such as a signaling endpoint (SEP) 412, and a bearer endpoint (BEP) 414. In an embodiment, the one or more backend services further include a server token service 416 and a registry service 418. The server token service 416 may be associated with security token authentication/authorization functions for services. The backend services module 402 is hosted using cloud web services 420 such as, but not limited to Amazon Web Services® (AWS) in the server computing device (e.g. 312) or in the cloud 306.

In an embodiment, fragments, or parts of the discovery service 406 and the signaling service 408 are implemented both on the backend server (e.g. 312) and on edge nodes (e.g. 302). For instance, network proxies (or nodes) in each cluster are parts of the signaling service 408 and supernodes (or super edge cloud computing devices) in each cluster are part of the discovery service 406. As can be appreciated by those skilled in the art, the disclosed cloud architecture departs from the existing notion of "service in the cloud— client on the edge". Its value comes from distribution of services over the entire range, from central cloud (e.g. 306) all the way to the edge nodes (as explained later with reference to FIG. 7).

The discovery service 406 is configured to hold and provide the knowledge to form one or more clusters, the overall status of the clusters, and the nodes within them. Once a cluster is formed, any new node registers with the supernode that subsequently informs the discovery service 406 via the supernode. In order to reduce traffic for scalability, updates from the supernode to the discovery service 406 happen in an opportunistic fashion and only when a change occurs in the one or more clusters.

In an embodiment, the discovery service 406 is configured to perform a reachability test to a supernode. When a supernode registers itself, the discovery service 406 tests for reachability. The supernode might be behind a firewall and while it can initiate a call to the discovery service 406, the discovery service or other external nodes might not be able to imitate a call to the supernode. In such cases, the discovery service 406 will request the signaling service 408 to dynamically deploy a signaling endpoint (SEP) (e.g. 412) for the cluster. Subsequently, the discovery service 406 returns the SEP address to the supernode.

In yet another embodiment, the discovery service 406 is configured to store a complete inventory of nodes and cluster profiles. This inventory includes details of computing resources on all the nodes, status of each node, location of each node, and services available on each node. The inventory further includes the end-to-end network topology to reach each node and the clusters, the reachability of the clusters, and the availability of resources and other pertinent information. In other words, the discovery service 406 has complete visibility to all resources across the edge cloud computing network 300 and can supply this information to dynamically deploy services on any available resource within the network in real-time. In an embodiment, the disclosed architecture uses standard amazon semantics to make it easier for developers to expose the resources in a similar fashion as in case of central cloud resources.

In an embodiment, the identity service 410 corresponds to a third-party identity software as a service (SaaS), for example based on the OAuth2.0, which resides in the public cloud and creates and maintains authentication profiles of nodes. In an embodiment, the disclosed cloud platform uses the identity service 410 (along with the server token service 416) for authorization of nodes by means of token generation and management for one or more token holders. The token holder can be the edge node activation module (e.g. 426, 508), the microservice (e.g. 518, 520, 522) using the edge node activation module, the application developer using the edge node activation module as well as the end-user of the application. The disclosed cloud platform uses the tokens to verify the credentials, legitimacy of the token holder, and authorize access to the one or more backend services provided by the backend services module 402. In an embodiment, the authorization is performed through the use of Jason Web Tokens (JWT) and a subset of standard "claims" for verifying the identity of the token holder.

In an embodiment, the signaling endpoint (SEP) 412 and the bearer endpoint (BEP) 414 are both resources deployed dynamically and on demand based on a request received from, for example, the discovery service 406 or the signaling service 408. As a result, there is no need to reserve computing resources. This increases efficiency and reduces the cost by deploying the end points only when needed. The SEP is used for signaling communication while BEP is used for data communications and jointly they assist the nodes to setup tunneling opportunistically to increase signaling and data bandwidth efficiency. SEP and BEP are deployed based on parameters such as, but not limited to time to go-live, number of concurrent connections, and communication protocols (HTTP, SSH, Web socket or UDP tunneling). If desired, end points can be deployed on an available computing resources within the closest proximity of the cluster.

In an embodiment, the server token service 416 is a SaaS based solution based on OAuth2.0. In an embodiment, the server token service 416 delivers tokens to services making requests to other services. In an embodiment, the server token service 416 resides in the public cloud and issue service tokens according to a system map. In addition, the server token service 416 implements "client_credentials" and "refresh_tokens" flow. When a microservice needs to invoke another microservice, it either already has a valid token and therefore can make the request directly or it requests a token which includes a list of permissions (or scopes). In an embodiment, the receiving service will validate the token signature and scopes in order to fulfill the incoming/received request. In an embodiment, such service to service tokens are short lived.

In an embodiment, the registry service 418 (also referred to as IT repository) is a SaaS solution which resides in the public cloud and maintains the list of all the backend microservices and the clusters to which they belong. Mostly used for administrative purposes, the registry service 418 maintains the cluster knowledge and allows clusters to be self-managed for configuration purposes. In an embodiment, the registry service 418 provides geo-located lists of clusters (or configurations as described later with reference to FIG. 6) that can be used by other services (e.g. the discovery service 406) to identify the signaling service 408 to invoke the SEP 412 or a BEP 414 when required.

Turning now to the edge elements of the distributed edge cloud platform, the edge cloud computing device 404 includes an edge node activation module 426. As described earlier, the edge node activation module 426 sits on top of an OS layer 428 and provides a microservice runtime environment for executing the one or more microservices using the microservice runtime environment module 424. One or more 3rd party applications 422 are also hosted in the edge cloud computing device 404 that are serviced by the edge node activation module 426. In an embodiment, developers can develop their own microservices that can be hosted on the edge devices or nodes using the container manager provided by the edge node activation module 426.

In an embodiment, the edge node activation module 426 is configured to turn any edge device (or edge cloud computing device) into a cloud server and extend the cloud computing infrastructure to that new edge. Edge devices can be any device with basic computing capability such as a laptop (e.g. 302), a set-top-box, a residential and IoT gateway, a game console connected TV, a car infotainment system (e.g. 308), a smart phone (e.g. 314), etc. Any edge device can download the edge node activation module 426 and execute it to "become" a cloud server. For the purposes of the ongoing description, any edge device that has executed the edge node activation module 426 is referred to as "node". Such nodes have one or more characteristics that are intended for the disclosed edge cloud platform and architecture. The one or more characteristics include the ability to dynamically discover each other (or other nodes) independent of the OS and network and include the ability to expose the computing and available capability and functionality to each other. The one or more characteristics further include the ability to form and organize into clusters (edge clusters) and communicate within the clusters even with no Internet availability, and across clusters.

The disclosed edge cloud platform operates by the formation of cluster nodes in accordance with the third principle of clustering as described supra. One or more cluster are formed by a first active node (or first edge cloud computing device) based on a particular scope. When a node (e.g. first edge cloud computing device) is activated (enabled with edge node activation module 426), it first looks for a supernode which oversees global discovery and holds the knowledge of the edge cloud. If no supernode is found, the first node declares itself as the supernode. If internet is available, the supernode then informs global discovery of its existence and receives the list of nodes within the defined scope. To maintain efficiency, the supernode informs other nodes within its scope.

Following the creation of a cluster by the supernode, subsequent nodes entering the cluster discover the existing supernode, register themselves to the supernode, and receive the list of nodes within their scope. The new nodes inform other nodes within their scope of existence. This bootstrap model is used by the disclosed cloud architecture to avoid overloading any nodes, whether global or local, and therefore to reduce traffic and chattiness. Given the potential non-persistency of the nodes, presence notification is intended as a functionality of the node itself along with the responsibility to decide which other nodes it wants to notify.

As explained above, the edge node activation module 426 can reside on any edge cloud computing device or server and can be made available for various hardware platforms and operating systems. In an embodiment, the edge node activation module 426 corresponds to an application-level software and can therefore be downloaded on many types of edge cloud computing devices. The backend services module 402 provides one or more backend services hosted on central cloud (e.g. 306) or any reachable and reliable computing resource with sufficient computing and memory and provide necessary services to support the edge nodes.

Figure 5:
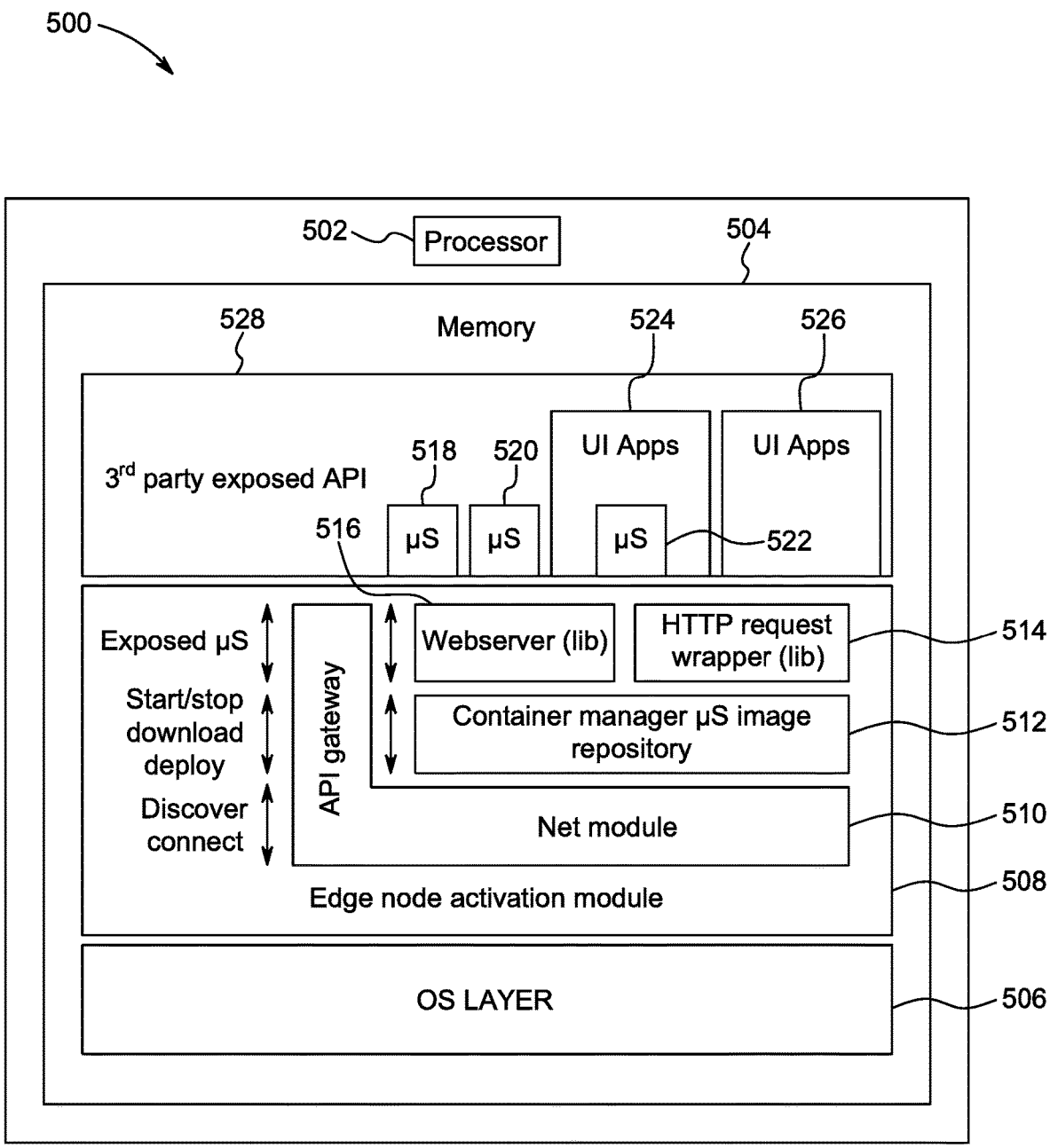
FIG. 5 shows an edge cloud computing device 500 in accordance with an embodiment.

FIG. 5 shows an edge cloud computing device 500 in accordance with an embodiment. As shown, the edge cloud computing device 500 includes a processor 502 coupled to a memory 504. The memory corresponds to non-transitory computer readable medium having instructions implementing the various technologies described herein. Example computer readable media may comprise tangible, non-transitory computer readable storage media having computer executable instructions executable by the processor 502, the instructions that, when executed by the processor, cause the processor to carry out any combination of the various methods and approaches provided herein. Although not shown, it may be appreciated that all the edge cloud computing devices (302, 304, 308, 310, 312, 314, 316, 404) and the central cloud (e.g. 306) include at least a processor (e.g. 502), a memory (e.g. 504), and/or various other applications or modules stored in the memory which when executed by the processor(s) carry out the methods and approaches described herein.

The memory 504 includes an OS layer 506 and an edge node activation module 508. The edge node activation module 508 further includes a Net module 510 having an API gateway. The edge node activation module 508 also includes a container manager microservice (μS) image repository 512, HTTP request wrapper (lib.) 514, and an embedded webserver 516. As explained earlier, the edge node activation module 508 is configured to expose one or more microservices to one or more edge nodes. In an embodiment, the edge node activation module 508 is configured to start/stop, download, deploy any service in the edge cloud and expose the services using the API gateway. To this end, the edge node activation module 508 is configured to discover, connect, and communicate with other edge nodes in one or more clusters (within or across). The memory 504 also includes one or more microservices (μS) depicted as 518, 520 and 522 in FIG. 5. The microservice 522 is shown to be a part of user interface (UI) apps 524. The memory 504 also includes other UI apps 526 without a microservice therein. All the microservices (518, 520 & 522) and the UI apps (524 & 526) are accessible through a 3rd party exposed API depicted as 528 in FIG. 5.

In an embodiment, the edge node activation module 508 corresponds to a collection of software libraries and corresponding APIs. It is intended that developers can also use the software libraries and APIs to efficiently solve the fundamental challenge of networking nodes in the new hyper-connected and highly mobile distributed edge computing world. The edge node activation module 308 can be delivered in a heterogeneous environment, regardless of OS, manufacturer, and connected network associated with any edge cloud computing device. Furthermore, the edge node activation module 508 can run (be executed) on any PC, server, mobile device, fixed gateway, autonomous car gateway, connected TV or even in the cloud, depending on the application use case. As described earlier, once the edge node activation module 508 is loaded onto an edge device, it becomes an edge cloud node.

As shown in FIG. 5, the edge node activation module 508 resides between the operating system layer 506 and the end-user applications (e.g. 524, 526). There are several microservices (e.g. 518, 520, 522) available from the edge node 500 and the edge node activation module 508 provides the ability for 3rd parties to develop their own microservices. The edge node activation module 508 also provides a microservice runtime environment. As described earlier, by incorporating the edge node activation module 508, computing devices are transformed into intelligent network nodes or edge nodes, that can form one or more clusters. The edge node activation module 508 takes away complexity of networking among distributed edge cloud nodes thereby enabling developers to focus on their solution in a microservice model even on small mobile devices (e.g. 314).

Nodes in a cluster are configured to take a specific role or combinations of roles, depending on physical hardware capability, OS, attached network connectivity, types of microservices running on each node and usage/privacy policy settings. Some roles are assigned through a process of election, considering other nodes within the cluster at any given time, while others are assigned through a process of selection. As described earlier, one of the most important roles in a cluster is that of the supernode (or a super edge cloud computing device), to which a node is elected by all member nodes. In a trivial case of a single-node cluster, a node serves as its own supernode. A supernode is configured to be the bearer of information regarding a cluster and all its member nodes. It is the "single source of truth" for the cluster. The supernode is configured to maintain information related to other nodes, microservices deployed on each node, as well as historical artifacts from the operation of edge node activation module 508. The supernode is configured to assign roles such as link-local proxy and link-local cache to other nodes in the cluster. A link-local proxy node supports communication in cases where cluster nodes reside behind a firewall. On the other hand, a node with large amounts of physical storage can be assigned the link-local cache role for the cluster.

For each node, the edge node activation module 508 supports a unique user and multiple microservices and application providers (otherwise called "tenants"). In other words, even if a user has loaded multiple applications on a mobile device all of which employ the edge node activation module 508, functionality and capabilities are related to (and authorized for) that user.

In an embodiment, the edge node activation module 508 provides discovery, connection, and communication among edge devices, both at physical and microservice levels. For example, the edge node activation module 508 provides for node and service discovery by auto-discovery and auto-routing for all nodes with instances of edge node activation module in local and global network(s). Similarly, the edge node activation module 508 provides for node and service connection in ad-hoc edge-cloud of nodes form a self-organizing cluster. In an embodiment, the edge node activation module 508 is configured to provide a light container to manage the one or more microservices by (remotely/locally) loading, running, and managing microservice instances. As described earlier, the edge node activation module 508 includes an edge web server for providing a microservices runtime environment.

As described earlier, nodes with the edge node activation module 508 are configured to discover, connect, and communicate with each other. In an embodiment, discovery is a "filtered search" operation, based on one or more scopes that corresponds to a user account i.e. nodes registered under the same account ID. In an embodiment, the edge node activation module 508 employs the OAuth 2.0 based OpenID standard through a third-party Identity SaaS provider (used as the identity service 410 provided by the backend services module 402). The scope may also correspond to a network, such as nodes that are members of the same link-local cluster network. The link-local identifier in this case is formed by combining the public IP address and the link-local network address. The scope may also correspond to proximity, such as, nodes which are reporting themselves as physically present at a geographical location or within an area defined by a geospatial query. The discovery process executed by the edge node activation module 508 can use any combination of the above described scopes. Microservices on each of these nodes and across clusters can use the edge cloud to form their own service mesh by calling each other via APIs. Furthermore, nodes and microservices running on nodes have unique identifiers, such as a specific microservice (e.g. a drive) on a specific node is addressable uniquely, locally, and globally.

In addition, the edge node activation module 508 provides microservice runtime environment (light container) to expose the services associated with microservices through a common embedded webserver. API endpoints for each service are accessible from all other nodes in an edge cluster through the API gateway which is part of the net module 510. The edge node activation module 508 complements container daemons (or Docker®) in two different ways. In environments (e.g. Linux®) that can run container daemons, the edge node activation module 508 provides functionalities to manage ad-hoc clusters of edge nodes as described earlier. In environments that cannot run container daemons (e.g. smart phones), the edge node activation module 508 provides additional "light" container capabilities with the ability to download, deploy and operate microservices. The embedded webserver (e.g. 516) provides a subset of container management (e.g. Docker®) APIs with one or more constraints. The one or more constraints include use of a specific language based on the underlying OS (Java for android, objective c for iOS®, etc.). The one or more constraints further include use of the web server provided by the edge node activation module 508 by the microservices that run on the "light" container environment (provided by edge node activation module 508) to optimize the usage of limited resources on the underlying platform.

The edge node activation module 508 allows developers to build and host microservices on any node. The disclosed cloud architecture also offers various microservices, utilizing the edge node activation module 508, to speedup application development and enable developers to immediately take advantage of the distributed edge cloud platform. For example, in case of a drive microservice, abstracts access to storage available on edge nodes and distributed file management via a popular API can be provided. In another illustrative example, a beam microservice is provided that beams content from a node to node(s) and/or to service(s), in a peer-to-peer, one-to-one and one-to-many fashion.

In an embodiment, the edge node activation module 508 implements a sidecar pattern that allows an application to be decomposed into components built using different technologies. Using the sidecar pattern any component of an application can be built and deployed in isolation. The latency is reduced due to proximity of the sidecar with the application, and components, functionality can be added without changing the application itself. The sidecar pattern abstracts many of the complexities of dealing with the service mesh. This is possible in the disclosed edge cloud computing architecture since many of these complexities are independent of the type of microservices deployed across the edge cloud. However, the side car pattern may not hide the distributed nature of the network. As an example, an API gateway, or security token management may be built using a sidecar pattern. In an embodiment, the API gateway is part of the net module 510 within the edge node activation module 508. The API gateway makes the API end-points for each service accessible from all other nodes in a cluster. By providing this API gateway, the edge node activation module 508 provides functionalities that abstract the complexity of dealing with other microservices in different clusters.

At the edge node, security becomes a crucial aspect of how microservices communicate. Certain elements like firewalls and network partitioning are very common in central cloud but may not generally exist on the edge. Therefore, it may be necessary to handle multiple levels of security. For instance, on the link-local cluster, it is not possible to use https because nodes in the cluster do not have domain names. The communication between nodes within the same link-local network are therefore encrypted. In addition, the API of each microservice is protected via tokens. Generally, the edge node activation module 508 runs in a trustless network environment. Therefore, it cannot be assumed that the firewalls protect the microservices running on edge nodes. In an embodiment, dealing with having a valid and non-expired token is abstracted by the sidecar pattern. Since that there are some special nodes that may manage data from other nodes (e.g. cache node, or link-local proxy node), user payload may need to be encrypted so that it is only visible to authorized parties. In an embodiment, acquiring the key, encrypting, and decrypting of user payload are also abstracted by the sidecar.

For proximity and user account clusters, routing to the proper node is a complex operation that requires dealing with the supernode and a link-local proxy node. In an embodiment, the sidecar hides this complexity from the developer of the microservice and the developers only need to invoke the appropriate microservice within the cluster. Distributed systems require retry mechanisms to ensure fault tolerance. In an embodiment, the sidecar handles retry calls and retry strategies. Developers can focus on developing their microservice rather than on the complexity of distributed systems. Similar to backend technologies like Istio which helps developers handle a service mesh, the edge node activation module 508 handles the service mesh at the edge and deals with all the constraints of using edge devices as servers.

Figure 6:
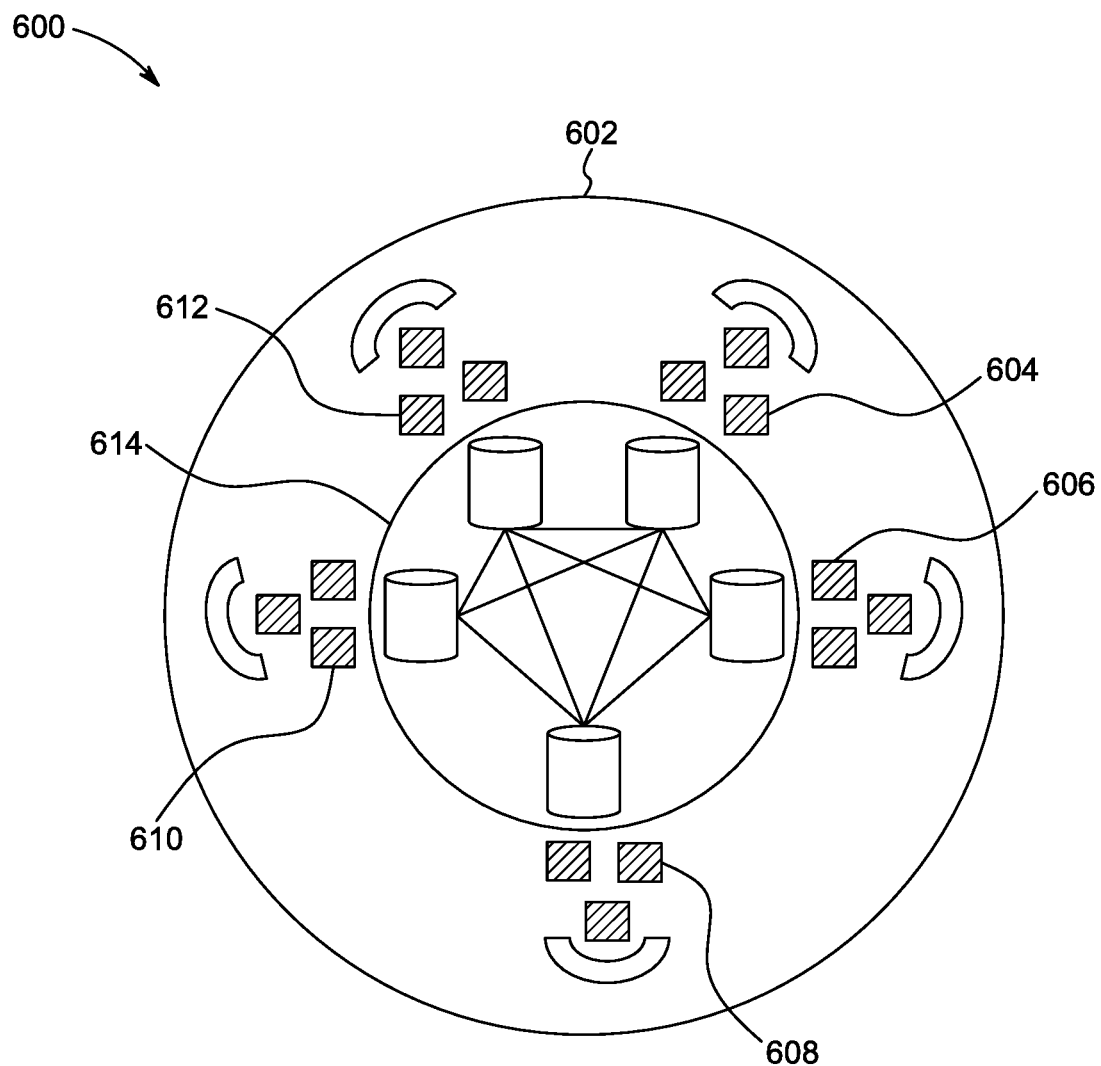
FIG. 6 shows an exemplary backend microservice distribution 600 in accordance with an embodiment.

FIG. 6 shows an exemplary backend microservice distribution 600 in accordance with an embodiment. In an embodiment, the backend system of the edge cloud computing platform is designed and deployed using a microservice based architecture as shown in FIG. 6. With reference to FIG. 6, each element is composed of a group 602 of geo-deployed clusters of microservices 604, 606, 608, 610, and 612 that are linked to a geo-distributed data store 614. In an embodiment, in order to ensure that the one or more microservices in the same or different cluster have the same view, the data store (e.g. 612) for the discovery service (e.g. 406), the registry service (e.g. 418), the server token service (e.g. 416), and the identity service (e.g. 410) need to be synchronized in a consistent manner.

In an embodiment, for the signaling services, SEP (e.g. 412) and BEP (e.g. 414), each microservice cluster is geo-independent. The signaling service (e.g. 408) is used to provide APIs to launch SEP (e.g. 412) and BEP (e.g. 414) components. The signaling service 408 keeps track of the existing BEP 414 and SEP 412 in a cluster of the signaling service 408 and provides information needed to properly load balance the BEP and SEP. In order to provide optimal latency based on where the BEP and SEP are needed, the signaling service 408 is independently geo distributed.

In an embodiment, the geo-deployed clusters of microservices can correspond to respective clusters of edge cloud computing devices. In other words, for a best case scenario, the microservices hosted in edge cloud computing devices in a cluster can form a cluster of microservices available to the edge nodes in the cluster. In an embodiment, the geo-deployed clusters of microservices can correspond to multiple clusters of edge cloud computing devices. In other words, for a next-best scenario, the microservices hosted in edge cloud computing devices in different clusters (e.g. 2 clusters) can form a cluster of microservices available to the edge nodes the (2) clusters.

Figure 7:
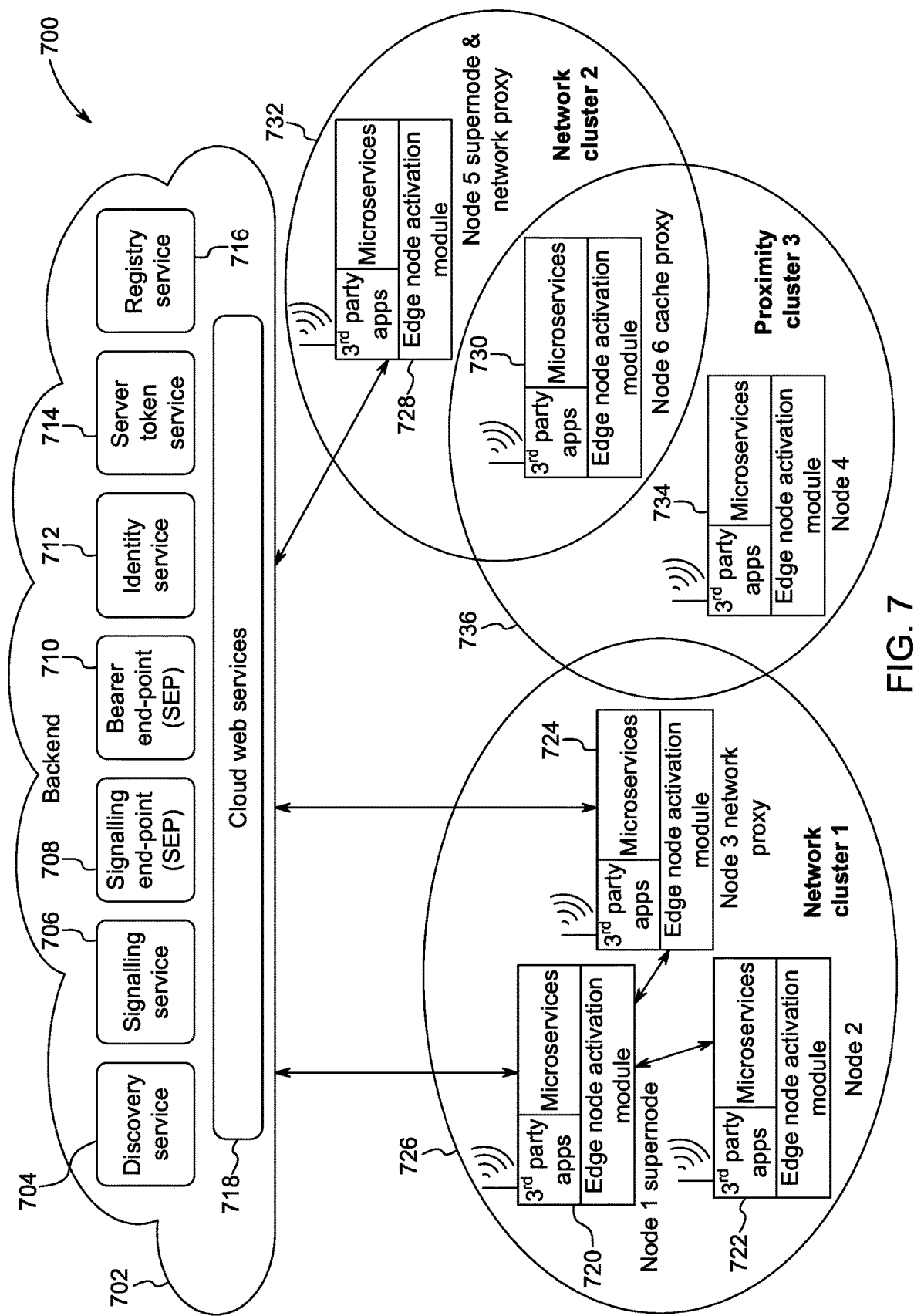
FIG. 7 shows an exemplary edge cloud computing architecture 700 in accordance with an embodiment.

FIG. 7 shows an exemplary edge cloud architecture 700 in accordance with an embodiment. As described earlier, the value of decentralized cloud comes from distribution of services over the entire range, from central cloud (e.g. 306) all the way to the edge nodes. FIG. 7 shows a backend services module 702 that is configured to provide one or more backend services that include a discovery service 704, a signaling service 706, an identity service 712, a server token service 714 and a registry service 716. The signaling service 706 is configured to provide a signaling endpoint (SEP) 708 and a bearer endpoint (BEP) 710. The one or more backend services are hosted on cloud web services 718. The disclosed cloud architecture allows collaboration between the backend services module 702 and the one or more nodes in the cloud to form one or more clusters.

For example, FIG. 7 shows 3 clusters: a network cluster 1 (726), network cluster 2 (732) and a proximity cluster 3 (736). The network cluster 1 (726) includes 3 nodes: node 1 which is a supernode (720), node 2 (722) and node 3 which is a network proxy node (724). The network cluster 2 (732) includes 2 nodes: node 5 which is supernode and network proxy node 728 and node 6 which is a cache proxy node 730. The proximity cluster 3 (736) includes 2 nodes: node 4 (734) and node 6 which is a cache proxy node 730. As described earlier, each of these nodes include an edge node activation module (e.g. 426, 508), one or more microservices (e.g. 518, 520), and one or more 3rd party apps (e.g. 422, 524, 526). The above-mentioned clusters were formed as a based on one or more scopes as described earlier. For instance, the network clusters 1 and 2 (722 and 728) were formed based on network as a scope and the proximity cluster 3 was formed based on proximity as a scope. Also, as shown in FIG. 7, a given node can be a part of 2 clusters, for example, node 6 which is a cache proxy node 726 is a part of network cluster 2 (728) and proximity cluster 3 (732). Various roles have been assigned to various nodes based on the considerations explained earlier.

Figure 8:
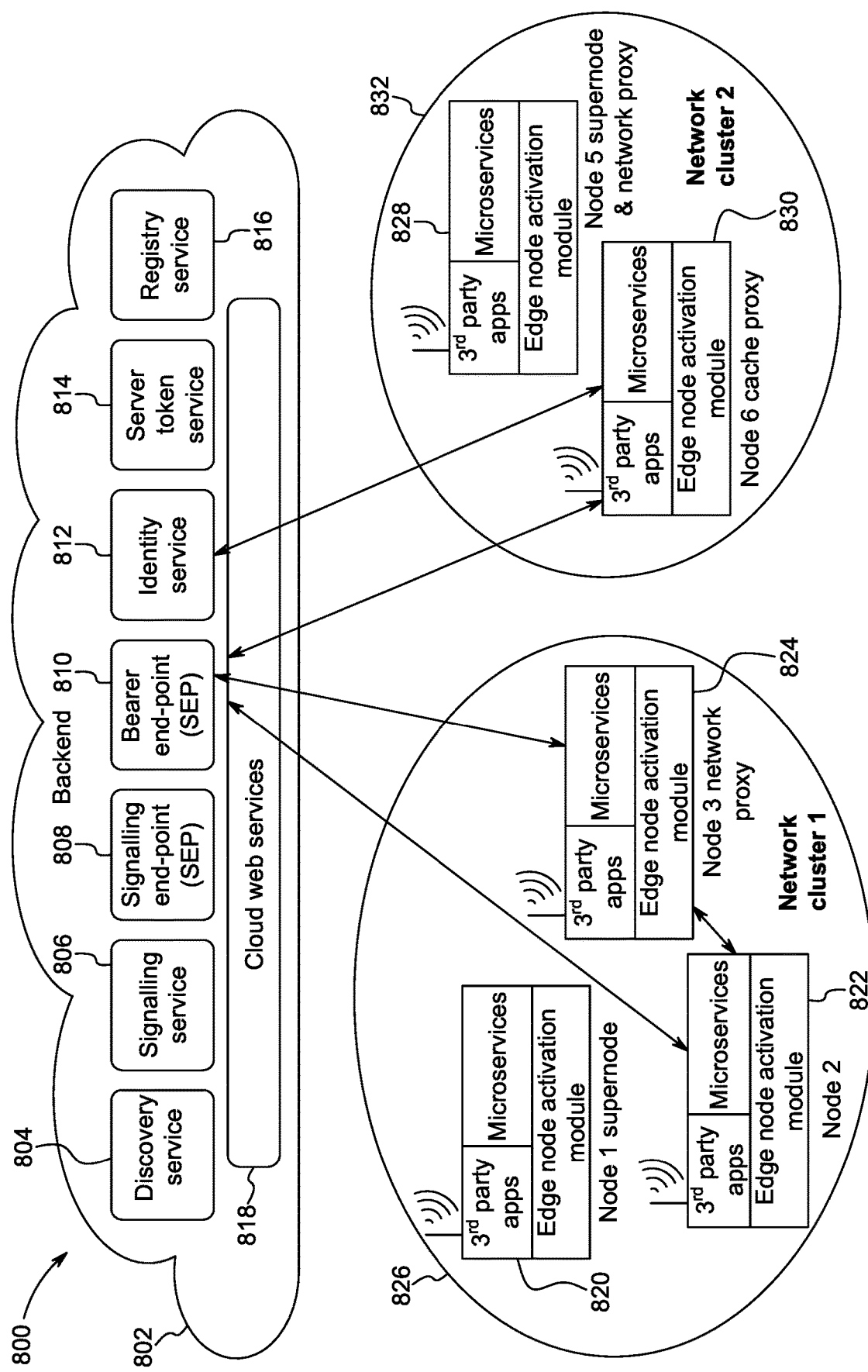
FIG. 8 shows exemplary embodiment of discovery, connection, and communication for two edge cloud computing devices belonging to same user ID in an edge cloud architecture 800 in accordance with an embodiment.

The mechanics of the signaling (SEP) and bearer (BEP) endpoints can be illustrated best via the example depicted in FIG. 8. FIG. 8 shows exemplary embodiment of a system 800 having discovery, connection and communication for two edge cloud computing devices belonging to same user ID. Similar to FIG. 7, FIG. 8 depicts a backend services module 802 configured to provide one or more backend services that include a discovery service 804, a signaling service 806, an identity service 812, a server token service 814, a registry service 816 hosted on cloud web services 818. The signaling service 806 is configured to dynamically deploy resources such as a signaling endpoint (SEP) 808 and a bearer endpoint (BEP) 810.

FIG. 8 also shows 2 clusters: a network cluster 1 (826) and network cluster 2 (832). The network cluster 1 (826) includes 3 nodes: node 1 which is a supernode (820), node 2 (822) and node 3 which is a network proxy node (824). The network cluster 2 (832) includes 2 nodes: node 5 which is supernode and network proxy node 828 and node 6 which is a cache proxy node 830.

For the purposes of the ongoing description, it is assumed that two nodes (node 2 shown as 822 in network cluster 1 and node 6 shown as 830 in network cluster 2) belong to the same user (account) and have already registered with their respective link-local network clusters. It is to be noted that these two nodes although belonging to the same user account are part of two different clusters. The disclosed edge architecture provides the SEP 808 as a reachable endpoint for node 6 (830), that it can use to communicate with node 2 (822) as if it were directly accessible. The communication between these two nodes is performed in an inter-cluster fashion using the SEP 808. After the signaling is established, the BEP 810 is provided for the bulk of the exchange among the two nodes 822 and 830. The flexibility of separating signaling, and bearer channels allows the creation of "service-specific" BEPs that are not restricted to HTTP based service delivery.

As described earlier, the process of discovery, connection and communication amongst nodes includes the first step of sending discovery requests (by a new node) to the supernode (e.g. 820) for nodes that belong to a scope (e.g. network). The process further includes the step of obtaining a list of nodes together with appropriate signaling information from the supernode. The process further includes sending requests to remote nodes (in different clusters) via SEP (e.g. 806). The process also includes having remote nodes request BEP (e.g. 810) for providing a service. The process concludes with the step of connecting and communicating to consume the service through the BEP provisioned.

As described earlier, one of the major advantages of the edge node activation module 426 is the ability to develop frontend applications on typical client devices using the microservice concept and architecture. The move to microservices is triggered by three major trends. First, microservices implement and expose RESTful APIs (HTTP REST based). A set of easy-to-use APIs can hide internal complexities and facilitate communication between microservices within a system. Second, it is possible to build complex systems made up of a potentially large number of system elements by deploying microservices automatically using deployment scripts (e.g. Ansible) that are controlled by a pipeline infrastructure (e.g. Jenkins). Moreover, automated deployment can help build flexible systems by providing the ability to decide where deployments happen. Third, the ability to request IT resources (such as, CPU, storage, and network) through simple APIs, and to get these resources in a near real-time fashion makes creation of large and scalable systems more feasible.

However, the transition to microservices and edge cloud may require development teams to work more closely because it blends different knowledge and expertise together. For instance, it may require the skills of backend developers. In order to support billions of small clients (e.g. IoT), there is a significant burden on the central cloud. On the one hand, too many resources may remain idle waiting for signals from clients on the edge. On the other hand, at times, fulfilling the performance demands of an application may not be feasible. For instance, deploying a backend system in the US to support a client in Europe may not satisfy latency constraints for many applications. Therefore, backend developers need to better leverage client resources to help support these new demands. They may be forced to offload many of the functions closer to the application even if it requires deploying part of the backend system in the "client" device running the application.

Yet another expertise needed for the transition implementation is that of IT/DevOps. For a long time, IT teams have been responsible for figuring out and managing the infrastructure where solutions are to be deployed. They have to consider many constraints and parameters such as deployment and operations costs, scalability, and elasticity. For most applications, the scope of the cloud infrastructure is a single data center, and the main task is to address computing and networking resource constraints. To support the explosion of device and data at the edge, the scope should be expanded to deploying IT resources at the right time and the right place (generally beyond the scope of a data center). New scopes such as proximity, account and link-local presence need to be considered to ensure efficient deployment and operations.

Yet another expertise needed for the transition implementation is that of frontend developers: The frontend applications used to perform simple tasks such as, inputting and sending information to the backend and/or rendering information coming from the backend. Most of the complex functions are generally relegated to the backend servers. However, given the explosion of data generated at the edge, many new functions have to be supported on the "client device" such as, caching, augmented reality (AR), image recognition, authorization, and authentication. As a result, frontend applications are becoming larger and more complex (e.g. the Facebook® app on iOS® has tripled in size to over 300 Mbytes in less than 2 years). Therefore, there is an opportunity to transition from a monolithic frontend app design to a microservice architecture and decompose the frontend app subsystem into microservices. The app can then seamlessly call microservices that are local on the device along with those running on the backend (hosted on central cloud).

One of the many consequences of a microservices based system is the choice between multi-tenancy and single-tenancy. A major benefits of public cloud is multi-tenancy where multiple applications can share public cloud resources and microservices deployed on them. However, certain applications may have to deploy microservices that need to remain as single-tenant for a variety of reasons such as security or data privacy. Therefore, a hybrid approach where one can choose whether a microservice is multi-tenant or single tenant may be a better approach.

Yet another important aspect is whether a microservice is single-user or multi-user. At a first glance, it may appear that multi-user microservices are more desirable. However, this may not always be the case. For instance, if a microservice is to always serve a single user within a "client device" or a pair of "client devices" where only one acts a client and the other as server, a multi-user platform may be inefficient. Therefore, a hybrid approach where one can choose whether a microservice is multi-user or single-user may be a better approach.

As the complexity of systems increases, the benefits of a hybrid approach to both these aspects become of paramount importance. In an embodiment, the edge node activation module (e.g. 426) may be developed from scratch to provide flexibility and ease of implementation of a hybrid approach to benefit backend, frontend, and DevOps. The benefits can include simplicity, flexibility, repeated deploy-ability and scalability of the development as will be described with reference to FIG. 9 and FIG. 10.

Figure 9:
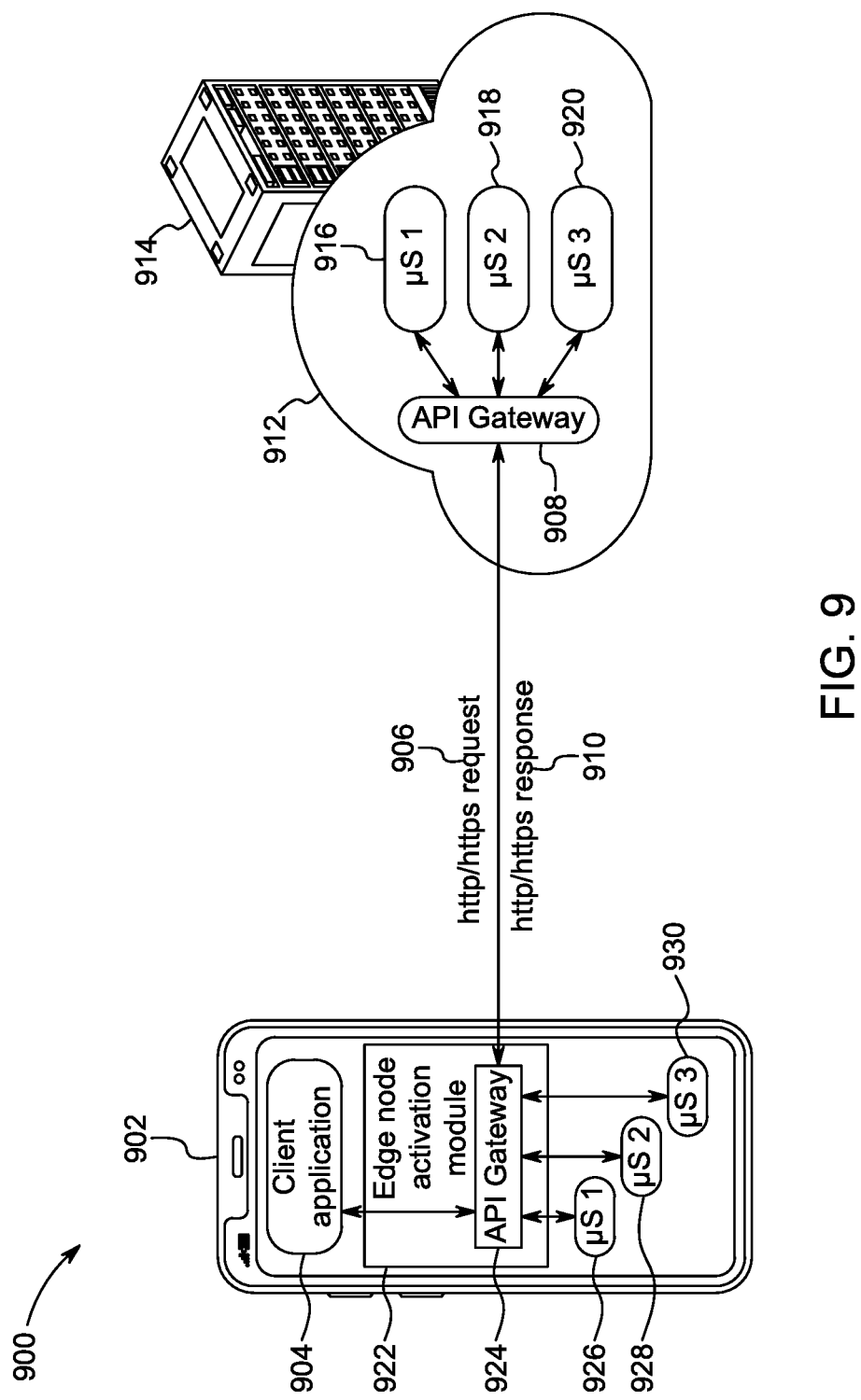
FIG. 9 shows an exemplary edge cloud architecture 900 implemented using serverless microservices in a sidecar pattern in accordance with an embodiment.

FIG. 9 shows an exemplary edge cloud architecture 900 implemented using serverless microservices in a sidecar pattern in accordance with an embodiment. As shown, the architecture 900 includes client device 902 running a 3$^{rd}$ party application or a client application 904. The client device 902 includes an edge node activation module 922 and one or more locally hosted microservices 926, 928, and 930. The edge node activation module 922 includes an API gateway 924 communicating with an API gateway 908 hosted in the central 912 or in the cloud computing device 914. In an embodiment, the edge node activation module 922 receives a request from the client application 904 and determines a type of one or more microservices required to service the request. If the request can be serviced by locally hosted microservices (e.g. 926, 928, 930), then the API gateway 924 sends the request to the appropriate microservice that is instantiated or launched. The locally hosted microservices may be loaded from a remote device or can be dynamically instantiated (in runtime) based on the demand from the client application 904. The launched microservice (e.g. 926) services the request and sends a response back to the client application 904 through the API gateway 924.

However, if the determined type of microservice required to service the request is of a global nature or corresponds to a globally hosted microservice, then the API gateway 924 sends an http/https request 906 to the API gateway 908. The API gateway 908 launches an appropriate microservice (e.g. 916, 918, 920) that is globally or centrally hosted on the central cloud 912 to service the http/https request 906. The API gateway 908 sends an http/https response 910 to the API gateway 924. In contrast to FIG. 1, the client application 904 can take advantage of locally hosted microservices that are exposed by the edge node activation module 922 and also the globally hosted microservices that are exposed by the API gateway 908.

In an embodiment, backend developers can easily, where plausible, transition from a multi-user microservice to a single-user microservice that resides on the closest resource to the application i.e., on the same resource where the frontend application is running. In an embodiment, the resource exists as the application exists and the microservice exists only if the application makes a request through the API gateway provided by the edge node activation module. This reduces the complexity of developing multi-user microservices and brings the serverless microservice model to all kinds of edge resources beyond central cloud. As long as serverless microservices (e.g. 926) expose their RESTful APIs, microservices can be utilized cross-domain.

On the other hand, the IT/DevOps will have a smaller number of microservices to manage in central cloud which helps reduce complexity and operational cost. When microservices reside closer to the application needed (for instance on the client device 902), a horizontal scalability with minimal or even no hosting cost is achieved. The complexity is also reduced because there is no need for different infrastructure knowledge since resources at the edge appear the same (albeit with different constraints) as the resources on the central cloud.

Further, the frontend application developers can follow backend development methodologies and decompose the complexity of the frontend application to serverless microservice, and sidecar pattern as illustrated in FIG. 9. Developing applications with the edge node activation module (e.g. 426, 508, 922) provides the flexibility for the developer to decide where an application is active and decide what microservices need to run where, within a cluster of nodes: on central cloud, on a local device, or another device within the cluster. As a result, the developer has more options to break down a client application, usually written as a monolithic block, into microservices and enjoy all the benefits of microservice architecture common in backend development: scalability, flexibility, choice of technologies, isolated impact on other modules or functions, ease of deployment, etc.

Figure 10:
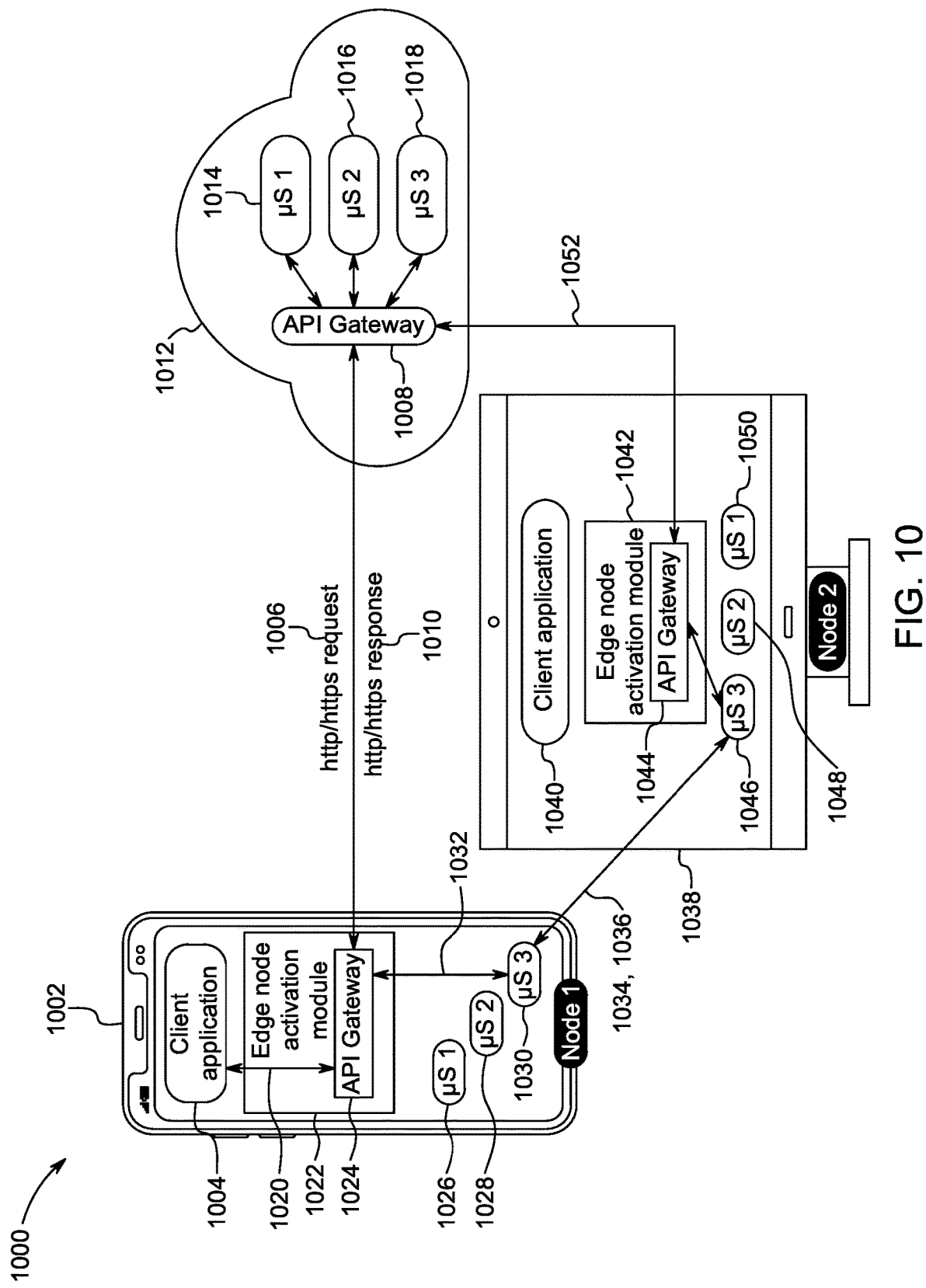
FIG. 10 shows an exemplary serverless microservice 1000 for applications taking advantage of microservices hosted locally and globally in accordance with an embodiment.

FIG. 10 shows an exemplary serverless microservice 1000 for applications taking advantage of microservices hosted locally and globally in accordance with an embodiment. In contrast to the central cloud approach shown in FIG. 1 and FIG. 2, the client application can make requests not only to the API gateway in the central cloud but also locally to the same device. In other words, the application can take advantage of microservices hosted locally for local functions and globally on the central cloud for those functions that cannot be hosted locally. This concept can be expanded to multiple devices and edge nodes as shown in FIG. 10 for the example of client to client communication.

As shown, the architecture 1000 includes two client devices 1002 and 1038 running 3$^{rd}$ party applications or client applications 1004 and 1040, respectively. The client devices 1002 and 1038 include an edge node activation module 1022 and 1042, respectively. Each of the client devices locally host one or more microservices. For example, the client device 1002 hosts microservices 1026, 1028, and 1030. Likewise, the client device 1038 hosts microservices 1046, 1048, and 1050. The edge node activation module 1022 includes an API gateway 1024 configured to communicate with an API gateway 1008 hosted in the central 1012. In an embodiment, the edge node activation module 1022 receives a request 1020 from the client application 1004 and determines a type of one or more microservices required to service the request. If the determined type corresponds to one or more locally hosted microservices (e.g. 1026, 1028, 1030), then the API gateway 1024 sends the service request 1032 to the appropriate microservice that is instantiated or launched. In an embodiment, the locally hosted microservices may be loaded from a remote device or can be instantiated based on the demand from the client application 1004. The microservice (e.g. 1026) services the request and sends a response back to the client application 1004 through the API gateway 1024.

However, if the determined type of microservice required to service the request is of a global nature or corresponds to a globally hosted microservice, then the API gateway 1024 sends an http/https request 1006 to the API gateway 1008. The API gateway 1008 launches an appropriate microservice (e.g. 1014, 1016, 1018) that is globally or centrally hosted on the central cloud 1012 to service the request. The API gateway 1008 sends an http/https response 1010 to the API gateway 1024.

In an embodiment, the edge node activation module 1022 determines that the type of one or microservices required to service the request 1020 corresponds to microservices hosted on another client device (e.g. 1038). The edge node activation module 1022 enables a direct communication with the API gateway 1042. In yet another embodiment, the edge node activation module 1022 enables a direct microservice to microservice communication between 1030 and 1046. For instance, the microservice 1030 sends a data request 1034 to the microservice 1046. The microservice 1046 services the data request and sends a response 1036 to the microservice 1030. In contrast to the central cloud approach shown in FIG. 2, where edge devices act as clients only, the client to client communication can happen directly between edge devices/client devices (or through servers in central cloud) as described above. This gives the developer an opportunity to optimize all aspects of deployment, such as, cloud hosting costs, latency, bandwidth usage, data privacy and all other benefits that come with the microservice architecture for typical backend functions.

As a result, disclosed embodiments of edge node activation module benefits the developers by seamlessly expanding the notion of on-demand IT resources to the edge by using the same models and APIs. It further expands the notion of clustering by adding new cluster scopes: user account, proximity, and network. It further expands on the notion of service mesh by providing a sidecar pattern at the edge to handle the API gateway, security, and routing for communication with other microservices whether locally on the edge globally or in central cloud.

In an embodiment, developing applications with edge node activation module (e.g. 426, 508, 922, 1022) enables the developers with more options, simplicity, and flexibility. Solution developers can make the decision on where the data resides based on the solution business logic. Consequently, what is disclosed herein is a pragmatic approach for building an edge cloud with orders of magnitude more processing power, storage, and memory leveraging edge resources that are currently unused or seriously underutilized. This can create a cloud fabric that is orders of magnitude larger, cheaper, faster, and can provide better data privacy for all consumer and enterprise applications.

Figure 11:
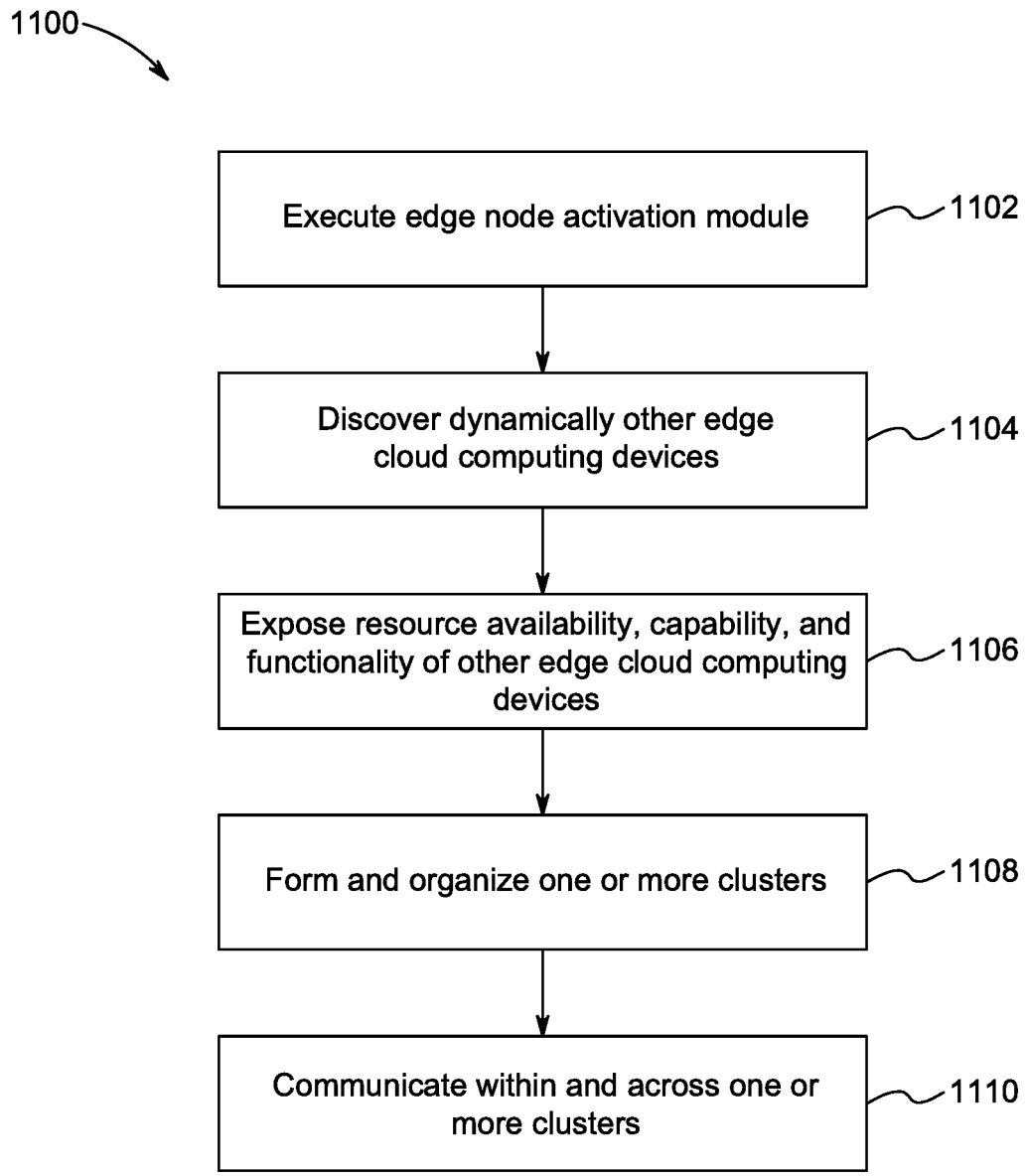
FIG. 11 shows an exemplary embodiment of a method 1100 of providing cloud computing infrastructure.

FIG. 11 shows an exemplary embodiment of a method 1100 of providing cloud computing infrastructure or a platform. With reference to FIGS. 1-10, the edge cloud computing infrastructure is implemented in a communication network (e.g. edge cloud computing network 300) that includes one or more edge cloud computing devices (e.g. 302, 304) in communication with a server computing device (e.g. 312).

The method includes executing as in step 1102, by a first edge cloud computing device (e.g. 404, 500), an edge node activation module (e.g. 422, 508). In an embodiment, the edge node activation module is a software-level application downloadable by the first edge cloud computing device. The method further includes discovering dynamically as in step 1104, by the first edge cloud computing device, other edge cloud computing devices (e.g. 310) independent of the operating system and network associated with the other edge cloud computing devices. The method further includes exposing as in step 1106, by the first edge cloud computing device, resource availability, capability, and functionality of the discovered other edge cloud computing devices (e.g. 310). The method further includes forming and organizing as in step 1108, by the first edge cloud computing device, one or more clusters (e.g. 722, 732) of the discovered other edge cloud computing devices. The method also includes communicating as in step 1110, by the first edge cloud computing device, within the one or more clusters and across the one or more clusters.

In an embodiment, the method further includes, subsequent to executing the edge node activation module (e.g. 422), searching, by the first edge cloud computing device, for a super edge cloud computing device (or a supernode). As described earlier, the super edge cloud computing device is configured to manage globally discovery. The method further includes in an event of not finding a super edge cloud computing device during the searching, designating, by the first edge cloud computing device, itself as the super edge cloud computing device. In another embodiment, the method includes communicating, by the first edge cloud computing device, global discovery of its existence and receiving, by the first edge cloud computing device, a list of one or more edge cloud computing devices within a scope of the first edge cloud computing device.

In yet another embodiment, the method further includes receiving, by the first edge cloud computing device, a request for registration from one or more edge cloud computing devices entering subsequently in the one or more clusters. The method also includes transmitting, by the first edge cloud computing device, to the registered one or more edge cloud computing devices a list of one or more other edge cloud computing devices within the scope of the first edge cloud computing device.

Figure 12:
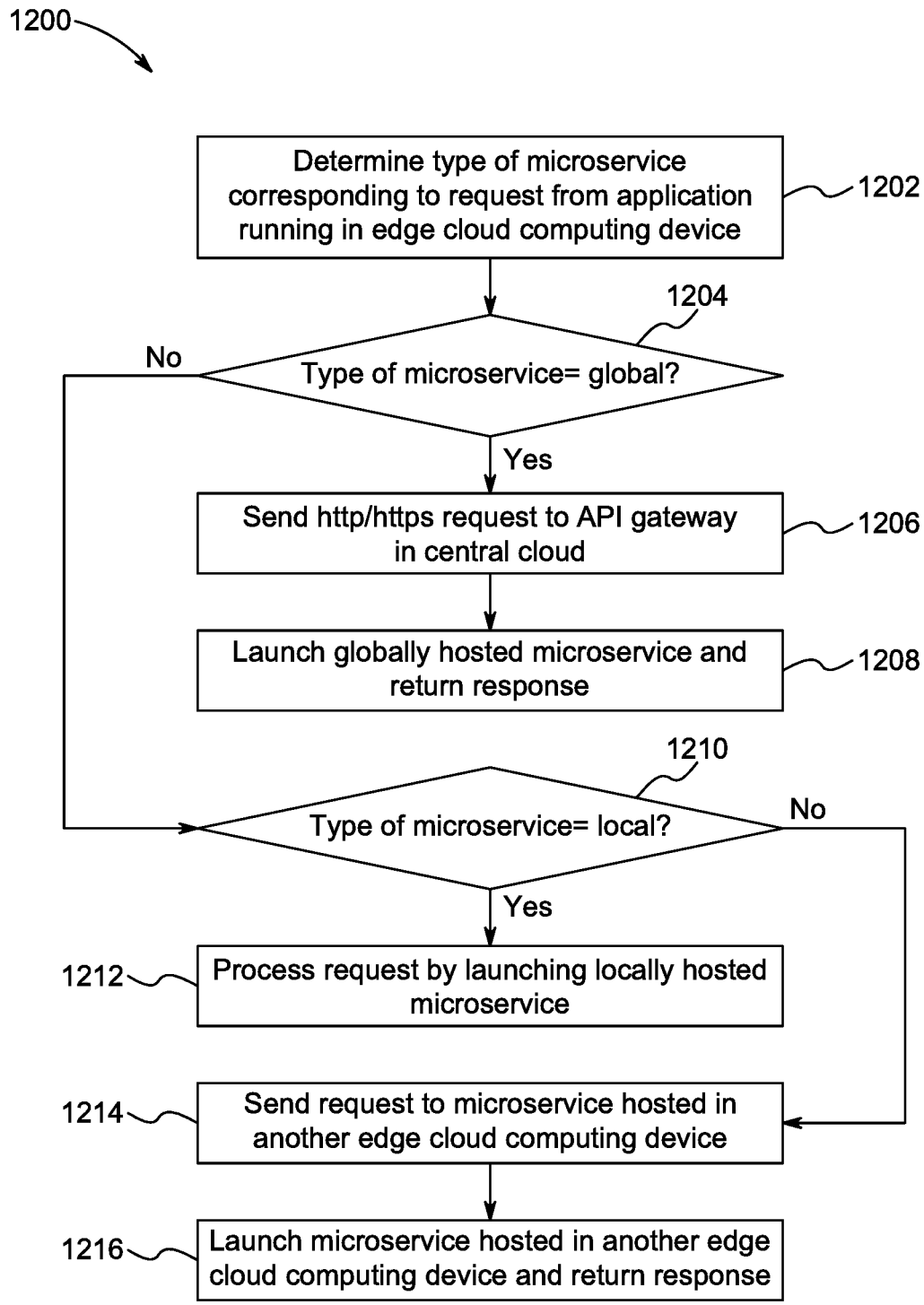
FIG. 12 shows another embodiment of a method 1200 of providing cloud computing infrastructure.

FIG. 12 shows an exemplary embodiment of a method 1200 of providing cloud computing infrastructure or a platform. With reference to FIGS. 1-11, the edge cloud computing infrastructure is implemented in a communication network (e.g. edge cloud computing network 300) that includes one or more edge cloud computing devices (e.g. 302, 304, 500, 902, 1002) in communication with a server computing device (e.g. 312).

The method is performed by a first edge cloud computing device (e.g. 902, 1002) and includes determining, as in step 1202, a type of microservice corresponding to a request from a client application (e.g. 904, 1004) running in the first edge cloud computing device. The method further includes determination of whether the type of microservice is global as in step 1204. In other words, the request from the client application can be serviced only by a globally or centrally hosted microservice (e.g. 916, 918, 920, 1014, 1016). On a positive determination at step 1204, the first edge cloud computing device sends an http/https request (e.g. 906,1006) to the API gateway (e.g. 908, 1008) in the central cloud (912, 1012) as in step 1206. The method further includes launching the globally hosted microservice (e.g. 916, 1014) and returning a response (e.g. http/https response 910, 1010) to the first edge cloud computing device as in step 1208.

On a negative determination at step 1204, the method further includes a determination of whether the type of microservice corresponding to the request from the client application is local or not, as in step 1210. If yes, the method further includes processing the request by launching a locally hosted microservice (e.g. 1026, 926) as in step 1212. If not, then the method includes sending the request directly to a microservice hosted in another (second) edge cloud computing device (e.g. 1038) as in step 1214. The method further includes launching a microservice (e.g. 1046) hosted in the another (second) edge cloud computing device (1038) and returning a response to the request.

As described herein, the edge node activation module enables the edge cloud computing device or client device to dynamically create or instantiate microservices locally. The edge node activation module also discovers the other edge nodes present in a given cluster or across clusters and exposes one or more microservices hosted in the discovered edge nodes. This way, any edge node can act as a "server" or a "client" and a given request from client application can be serviced either locally or globally or by other edge nodes as per the demand (type) of the service request.

Embodiments of a server computing device are disclosed. The server computing device is configured for operation in a communication network that includes one or more edge cloud computing devices in communication with the server computing device. In an embodiment, the server computing device includes a backend services module configured to provide one or more backend services to support the one or more edge cloud computing devices. The one or more backend services include a discovery service configured to provide knowledge to form one or more clusters of the one or more edge cloud computing devices, wherein each of the one or more clusters comprise at least one super edge cloud computing device. The backend services further include a signaling service configured to dynamically deploy a Signaling Endpoint (SEP) and a Bearer Endpoint (BEP) for the one or more clusters upon receiving a request from the discovery service. The backend services further includes a server token service configured to deliver a token to a microservice, in a first edge cloud computing device in the one or more clusters, making requests to another microservice, in a second edge cloud computing device in the one or more clusters.

In an embodiment, the one or more backend services further include an identity service configured to create and maintain authentication profiles of the one or more edge cloud computing devices. In an embodiment, the one or more backend services further includes a registry service configured to maintains a list of all microservices provided in the one or more clusters and associated clusters information. In an embodiment, the registry service is further configured to maintain cluster knowledge of the one or more clusters to allow the one or more clusters to be self-managed for configuration purposes. In an embodiment, the registry service is further configured to provide geo-located lists of clusters and associated configuration details to be used by the one or more backend services.

In an embodiment, the knowledge to form one or more clusters includes profiles of the one or more clusters, details of computing resources associated with the one or more edge cloud computing devices forming the one or more clusters, status and/or location of the one or more edge cloud computing devices forming the one or more clusters, one or more microservices available on the one or more edge cloud computing devices forming the one or more clusters, end-to-end network topology to reach each edge cloud computing device forming the one or more clusters, and reachability of the one or more clusters. In an embodiment, the discovery service is further configured to provide information associated with resources available in the communication network to dynamically deploy the one or more microservices on any available edge cloud computing device within the communication network in real-time. In an embodiment, the identity service is configured to generate and maintain a token for one or more of: an edge node activation module in each edge cloud computing device, a microservice using the edge node activation module, an application developer using the edge node activation module, and an end-user of an application supported by the edge node activation module.

Embodiments of an edge cloud computing device are disclosed. In an embodiment, the edge cloud computing device includes an edge node activation module configured to discover one or more other edge cloud computing devices based on a first set of parameters to establish a connection therebetween. The edge node activation module is further configured to provide a microservice runtime environment to execute one or more microservices associated with the connection established between one or more edge cloud computing devices. In an embodiment, the edge node activation module is configured to discover an existence of the one or more edge cloud computing devices regardless of an operating system and/or network type associated with the one or more edge cloud computing devices. The edge node activation module is further configured to discover capabilities and behavior associated with the one or more edge cloud computing devices and discover the one or more microservices supported by the one or more edge cloud computing devices. In an embodiment, the first set of parameters include a user account associated with each of the one or more edge cloud computing devices, a network associated with the one or more edge cloud computing devices, and a proximity of the one or more edge cloud computing devices.

The edge node activation module is further configured to dynamically form one or more clusters with the one or more edge cloud computing devices and communicate with the one or more edge cloud computing devices at a microservice level either directly or through other edge cloud computing devices across the one or more clusters. In an embodiment, the edge node activation module is further configured to connect with the discovered one or more edge cloud computing devices if the discovered one or more edge cloud computing devices chose to share data, services, and/or resources. The edge node activation module is further configured to expose the one or more microservices services through a common embedded web server. In an embodiment, one or more API endpoints for each microservice are accessible from the one or more edge cloud computing devices in a cluster through an API gateway. The edge node activation module is further configured to provide flexible container capabilities based at least in part on the respective computing environments associated with the one or more edge cloud computing devices. The respective computing environments run a container daemon to download, deploy, and operate the one or more microservices.

In an embodiment, the computing environment runs a container daemon to manage ad-hoc clusters of the one or more edge cloud computing devices. The edge node activation module further includes a webserver embedded within. The webserver is configured to provide container management APIs using specific language based on an operating system associated with the edge cloud computing device. The edge node activation module further includes one or more software libraries and corresponding APIs.

Embodiments of a server computing device are disclosed. The embodiments relate to a communication network that includes one or more edge cloud computing devices in communication with the server computing device. In an embodiment, the server computing device includes a backend services module configured to provide one or more services to support the one or more edge cloud computing devices. The one or more backend services include a discovery service configured to provide knowledge to form one or more clusters of the one or more edge cloud computing devices. Each of the one or more clusters include at least one super edge cloud computing device (or a super node). The one or more backend services further include a signaling service configured to dynamically deploy a Signaling Endpoint (SEP) and a Bearer Endpoint (BEP) for the one or more clusters upon receiving a request from the discovery service. The one or more backend services further include an identity service configured to create and maintain authentication profiles of the one or more edge cloud computing devices.

Once a first cluster is formed, the discovery service is configured to allow a new edge cloud computing device that is not part of the first cluster to register with the super edge cloud computing device corresponding to the first cluster. In an embodiment, the discovery service is further configured to allow each of the super edge cloud computing devices to register itself. In an embodiment, the knowledge to form one or more clusters includes profiles of the one or more clusters, details of computing resources associated with the one or more edge cloud computing devices forming the one or more clusters, status & location of the one or more edge cloud computing devices forming the one or more clusters, one or more services available on the one or more edge cloud computing devices forming the one or more clusters, end-to-end network topology to reach each edge cloud computing device forming the one or more clusters, and reachability of the one or more clusters.

In another embodiment, the discovery service is further configured to provide information associated with resources available in the communication network to dynamically deploy the one or more services on any available edge cloud computing device within the communication network in real-time. In yet another embodiment, the signaling service is configured to dynamically deploy the Signaling Endpoint (SEP) and the Bearer Endpoint (BEP) based on a demand for computing resources within the one or more clusters.

In still further embodiment, the Signaling Endpoint (SEP) is used for signaling communication and the Bearer Endpoint (BEP) is used for data communications. The dynamic deployment of the Signaling Endpoint (SEP) and the Bearer Endpoint (BEP) increases signaling bandwidth and data bandwidth for the one or more edge cloud computing devices in the one or more clusters. The signaling service is further configured to dynamically deploy the Signaling Endpoint (SEP) and the Bearer Endpoint (BEP) based on one or more parameters. The one or more parameters include time to go-live for the one or more services, number of concurrent connections in the one or more clusters, and one or more communication protocols associated with the one or more edge cloud computing devices in the one or more clusters.

In an embodiment, the signaling service is further configured to dynamically deploy the Signaling Endpoint (SEP) and the Bearer Endpoint (BEP) on an available edge cloud computing device within the closest proximity of the one or more clusters. The identity service is configured to generate and maintain a token for one or more of: an edge node activation module in each edge cloud computing device, a microservice using the edge node activation module, an application developer using the edge node activation module and an end-user of an application supported by the edge node activation module. In yet another embodiment, the identity service is configured to verify credentials and legitimacy of a token holder and authorize the token holder's access to the one or more services provided by the backend services module.

Embodiments of a method of providing edge cloud computing infrastructure (or a platform) are disclosed. The method is implemented in a communication network that includes one or more edge cloud computing devices in communication with a server computing device or a central cloud. The method includes executing, by a first edge cloud computing device, an edge node activation module. The method further includes discovering dynamically, by the first edge cloud computing device, other edge cloud computing devices independent of the operating system and network associated with the other edge cloud computing devices. The method further includes exposing, by the first edge cloud computing device, resource availability, capability, and functionality of the discovered other edge cloud computing devices. The method further includes forming and organizing, by the first edge cloud computing device, one or more clusters of the discovered other edge cloud computing devices. The method also includes communicating, by the first edge cloud computing device, within the one or more clusters and across the one or more clusters.

In an embodiment, the method includes, subsequent to executing the edge node activation module, searching, by the first edge cloud computing device, for a super edge cloud computing device (also referred to as "supernode" in the ongoing description). The super edge cloud computing device is configured to manage global discovery of nodes or edge cloud computing devices.

In an event of not finding a super edge cloud computing device during the searching, the method further includes designating, by the first edge cloud computing device, itself as the super edge cloud computing device. The method further includes communicating, by the first edge cloud computing device, global discovery of its existence and receiving, by the first edge cloud computing device, a list of one or more edge cloud computing devices within a scope of the first edge cloud computing device.

The method further includes receiving, by the first edge cloud computing device, a request for registration from one or more edge cloud computing devices entering subsequently in the one or more clusters and transmitting, by the first edge cloud computing device, to the registered one or more edge cloud computing devices a list of one or more other edge cloud computing devices within the scope of the first edge cloud computing device and/or within the scope of the registered one or more edge cloud computing devices.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition, or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

The invention claimed is:

1. An edge cloud computing device comprising:
   a processor configured to:
   receive a request from an application running in the edge cloud computing device;
   determine a type of one or more microservices required to service the received request;
   process the request locally in the edge cloud computing device when the determined type corresponds to one or more microservices locally hosted and deployed in the edge cloud computing device;
   search for a super edge cloud computing device that stores information of the one or more deployed microservices; and
   designate the edge cloud computing device as the super edge cloud computing device in an event the search fails,
      wherein the designated edge cloud computing device communicates a global discovery of existence of the edge cloud computing device and receives a list of edge cloud computing devices within a scope of the edge cloud computing device, and
      wherein the scope corresponds to at least computing devices of same link- local cluster network,
   discover one or more other edge cloud computing devices and one or more microservices hosted in the discovered one or more other edge cloud computing devices to establish a connection there between;
   provide a microservice runtime environment to execute the locally hosted one or more microservices associated with the connection established between one or more edge cloud computing devices in a same cluster or a different cluster of the one or more edge cloud computing devices;
   wherein the clusters of the one or more edge cloud computing devices comprises profiles of the one or more clusters, details of computing resources associated with the one or more edge cloud computing devices forming the one or more clusters, status and/or location of the one or more edge cloud computing devices forming the one or more clusters, one or more microservices available on the one or more edge cloud computing devices forming the one or more clusters, end-to-end network topology to reach each edge cloud computing device forming the one or more clusters, and reachability of the one or more clusters; and
   establish a direct microservice level connection between the locally hosted one or more microservices and the discovered one or more microservices in the one or more edge cloud computing devices.

2. The edge cloud computing device of claim 1, wherein the processor is further configured to provide a locally hosted API gateway to send the request to the locally hosted one or more microservices.

3. The edge cloud computing device of claim 1, wherein the locally hosted one or more microservices are configured to service the request and send back a response to the application.

4. The edge cloud computing device of claim 1, wherein the processor is further configured to receive, an http/https response for the http/https request, from the API gateway hosted in the central cloud computing device, and wherein the http/https request is serviced by the one or more microservices globally hosted in the central cloud computing device.

5. The edge cloud computing device of claim 1, wherein the processor is further configured to provide a locally hosted API gateway to send the http/https request to the API gateway hosted in the central cloud computing device.

6. The edge cloud computing device of claim 1, wherein the processor is further configured to send the request directly to one or more microservices hosted in another edge cloud computing device when the determined type of one or more microservices, required to service the received request, corresponds to one or more microservices hosted in the another edge cloud computing device.

7. The edge cloud computing device of claim 6, wherein the processor is further configured to implement a sidecar pattern to form a service mesh corresponding to the one or more microservices locally hosted in the edge cloud computing device and the one or more microservices hosted in the another edge cloud computing device.

8. The edge cloud computing device of claim 1, wherein the processor is configured to:
discover one or more other edge cloud computing devices based on a first set of parameters to establish a connection therebetween.

9. The edge cloud computing device of claim 8, wherein the processor is further configured to discover the one or more microservices supported by the one or more edge cloud computing devices.

10. The edge cloud computing device of claim 8, wherein the first set of parameters comprises:
a user account associated with each of the one or more edge cloud computing devices, a network associated with the one or more edge cloud computing devices, and a proximity of the one or more edge cloud computing devices.

11. The edge cloud computing device of claim 8, wherein the processor is further configured to:
dynamically form one or more clusters with the one or more edge cloud computing devices; and
communicate with the one or more edge cloud computing devices at a microservice level either directly or through other edge cloud computing devices across the one or more clusters.

12. The edge cloud computing device of claim 1, wherein the processor is further configured to expose the locally hosted one or more microservices services to one or more edge cloud computing devices through a common embedded web server.

13. The edge cloud computing device of claim 1, wherein the processor comprises a webserver embedded there within, wherein the webserver is configured to provide container management APIs using specific language based on an operating system associated with the edge cloud computing device.

14. The edge cloud computing device of claim 1, wherein each computing device of the link-local cluster network is identified by a link-local identifier formed by combining a public Internet Protocol (IP) address and a link-local network address.

15. The edge cloud computing device of claim 1, wherein a communication between computing devices within the same link-local cluster network is encrypted.

16. A method of providing edge cloud computing infrastructure in a communication network comprising one or more edge cloud computing devices in communication with at least one server computing device, the method comprising:
determining, by a first edge cloud computing device, a type of one or more microservices corresponding to a request from an application running in the first edge cloud computing device;
processing, by the first edge cloud computing device, the request locally in the first edge cloud computing device when the determined type corresponds to one or more microservices locally hosted and deployed in the first edge cloud computing device;
searching for a super edge cloud computing device that stores information of the one or more deployed microservices; and
designating the edge cloud computing device as the super edge cloud computing device in an event the search fails,
wherein the designated edge cloud computing device communicates a global discovery of existence of the edge cloud computing device and receives a list of edge cloud computing devices within a scope of the edge cloud computing device, and
wherein the scope corresponds to at least computing devices of same link-local cluster network;
discovering, by the first edge cloud computing device, one or more other edge cloud computing devices and one or more microservices hosted in the discovered one or more other edge cloud computing devices to establish a connection there between;
providing, by the first edge cloud computing device, a microservice runtime environment to execute the locally hosted one or more microservices associated with the connection established between one or more edge cloud computing devices in a same cluster or a different cluster of the one or more edge cloud computing devices;
wherein the clusters of the one or more edge cloud computing devices comprises profiles of the one or more clusters, details of computing resources associated with the one or more edge cloud computing devices forming the one or more clusters, status and/or location of the one or more edge cloud computing devices forming the one or more clusters, one or more microservices available on the one or more edge cloud computing devices forming the one or more clusters, end-to-end network topology to reach each edge cloud computing device forming the one or more clusters, and reachability of the one or more clusters; and
establishing, by the first edge cloud computing device, a direct microservice level connection between the locally hosted one or more microservices and the discovered one or more microservices in the one or more edge cloud computing devices.

17. The method of claim 16, further comprising:
providing, by the first edge cloud computing device, a locally hosted API gateway to send the request to the locally hosted one or more microservices.

18. The method of claim 16, further comprising:
receiving, by the first edge cloud computing device, an http/https response to the http/https request, from the API gateway hosted in the central cloud computing device, and wherein the http/https request is serviced by the one or more microservices globally hosted in the central cloud computing device.

19. The method of claim 16, further comprising:
providing, by the first edge cloud computing device, a locally hosted API gateway to send the http/https request to the API gateway hosted in the central cloud computing device.

20. The method of claim 16, further comprising:
sending, by the first edge cloud computing device, a data request from the locally hosted one or more microservices directly to one or more microservices hosted in a second edge cloud computing device when the determined type of the request from the application corresponds to a data request for the second edge cloud computing device.

21. The method of claim 16, further comprising:
providing, by the first edge cloud computing device, a sidecar pattern to form a service mesh to support the application running in the first edge cloud computing device.

22. The method of claim 16, further comprising:
exposing, by the first edge cloud computing device, the locally hosted one or more microservices services through a common embedded web server to one or more edge cloud computing devices.

23. The method of claim 16, further comprising:
providing, by the first edge cloud computing device, container management APIs using specific language based on an operating system associated with the edge cloud computing device.

24. The method of claim 16, further comprising:
loading and executing, by the first edge cloud computing device, one or more microservices required to service the request from the application.

25. The method of claim 24, further comprising:
stopping, by the first edge cloud computing device, the loaded one or more microservices once the request from the application has been serviced.

* * * * *